United States Patent [19]

Wilson

[11] 4,291,954
[45] Sep. 29, 1981

[54] AUDIOVISUAL SYSTEM WITH IMPROVED MOVING LIGHT POINTER

[75] Inventor: Stewart W. Wilson, Concord, Mass.

[73] Assignee: Polaroid Corporation, Cambridge, Mass.

[21] Appl. No.: 114,997

[22] Filed: Jan. 24, 1980

[51] Int. Cl.³ .................... G03B 21/00; G03B 31/00
[52] U.S. Cl. ......................... 353/42; 353/15; 318/568
[58] Field of Search .............. 353/15, 42; 360/88; 318/568, 604

[56] References Cited

U.S. PATENT DOCUMENTS

| | | | |
|---|---|---|---|
| 1,119,597 | 12/1914 | Henry | 353/122 |
| 2,848,922 | 8/1958 | Field | 353/42 |
| 3,220,305 | 11/1965 | Gelder et al. | 353/42 |
| 3,472,585 | 10/1969 | Halberg et al. | 353/27 R |
| 3,513,370 | 5/1970 | Pullen | 318/18 |
| 3,552,037 | 1/1971 | Stern | 434/286 |
| 3,683,402 | 8/1972 | Parnell | 346/32 |
| 3,717,893 | 2/1973 | Carlson | 318/568 |
| 3,760,254 | 9/1973 | Hardway | 318/662 |
| 3,799,663 | 3/1974 | Barre et al. | 353/27 |
| 3,802,614 | 4/1974 | Russell et al. | 353/26 A |
| 3,804,503 | 4/1974 | Sissom | 353/15 |
| 3,807,846 | 4/1974 | Swank | 353/27 |
| 3,807,851 | 4/1974 | Knox et al. | 353/120 |
| 3,832,050 | 8/1974 | Johannsen | 353/42 |
| 3,844,649 | 10/1974 | Walter et al. | 353/120 |
| 3,885,867 | 5/1975 | Nelson et al. | 353/27 |
| 3,897,146 | 7/1975 | Smith | 353/26 |
| 3,924,122 | 12/1975 | Russell et al. | 250/236 |
| 3,928,796 | 12/1975 | Kadaer | 324/61 R |
| 4,060,318 | 11/1977 | Hansford | 353/42 |
| 4,146,314 | 3/1979 | Wilson | 353/42 |

FOREIGN PATENT DOCUMENTS 1435510  5/1976  United Kingdom ................. 353/42

Primary Examiner—John W. Shepperd
Attorney, Agent, or Firm—Edward S. Roman

[57] ABSTRACT

Apparatus for projecting a highlighting spot on a projected image. When an operator uses an actuator for controlling the position of the highlighting spot, position control signals are applied to a servomechanism to position the highlighting spot in two axes. Simultaneously, the apparatus converts the control signals into a second form suitable for recording on a tape or other media in a control track simultaneously with an oral program on an audio track. The recorded control signals are converted back into a form corresponding to signals from the actuator thereby to control slide changes and the highlighting spot position.

19 Claims, 18 Drawing Figures

ANALOG-TO-DIGITAL SUBROUTINE

LATCH SUBROUTINE

TAPESIG SUBROUTINE

PHASE SUBROUTINE

TRANSMIT SUBROUTINE

RELAY SUBROUTINE

```
             SEL   RB0                    "6"     CALL  "LATCH"
             CLR   F1                             MOV   R5,    #03
             MOV   R0,    #2A
             MOV   @R0,   #00             "6A"    MOV   R1,    #2B
             CLR   A                              MOV   @R1,   #00
             OUTL  BUS,   A                       INC   R1
             CPL   A                              MOV   @R1,   #00
             OUTL  P1,    A                       MOV   A,     #10
             MOV   A,     #CC                     MOV   T,     A
             OUTL  P2,    A                       STRT  T
             JMP   "0"
                                          "6B"    CALL  "TAPESIG"
"0"          SEL   RB0                    "7"     JTF   "8"
             IN    A,     P1                      JMP   "6B"
             JB0   "1"
             JB1   "2"                    "8"     STOP  TCNT
             JB2   "3"
             JB3   "4A"                   "9"     ORL   P2,    #03
             JMP   "4"                            CALL  "PHASE"
                                                  MOV   A,     R2
"4A"         JMP   "20"                           MOV   R7,    #03

"1"          MOV   R2,    #01             "10"    CALL  "TRANS"
             ANL   P2,    #FB                     DJNZ  R7,    "10"
             JMP   "5"                            MOV   A,     R3
                                                  MOV   R7,    #08
"2"          MOV   R2,    #02
             ANL   P2,    #F7             "11"    CALL  "TRANS"
             JMP   "5"                            DJNZ  R7,    "11"
                                                  MOV   A,     R4
"3"          MOV   R2,    #04                     MOV   R7,    #08

"5"          MOV   R3,    #00             "12"    CALL  "TRANS"
             MOV   R4,    #00                     DJNZ  R7,    "12"
             MOV   R0,    #2A                     ANL   P2,    #FE
             MOV   @R0,   #00                     MOV   A,     R2
             JMP   "6"                            JB0   "13"
                                                  JB1   "13"
"4"          MOV   R2,    #00                     JB2   "14"
             MOV   R0,    #03                     JMP   "0"
             ORL   P2,    #10
             CALL  "AD"                   "13"    DJNZ  R5,    "6A"
             MOV   R0,    #04                     ANL   P2,    #FD
             ORL   P2,    #20                     CALL  "RELAY"
             CALL  "AD"                           JUMP  "0"
             MOV   R0,    #2A
             MOV   @R0,   #01             "14"    DJNZ  R5,    "6A"
                                                  ANL   P2,    #FD
                                                  JMP   "0"
```

FROM FIG. 9A

```
"20"     MOV   R0,  #2C              "32"    CALL  "30"
         MOV   A,   @R0                      JMP   "31"
         JB0   "21"
         JMP   "40"                   "28"    CALL  "30"
                                             ANL   P2,  #FB
"21"     MOV   A,   #01                      CALL  "RELAY"
         MOV   T,   A                        JMP   "31"

"22"     STRT  T                     "29"    CALL  "30"
                                             ANL   P2,  #F7
"23"     JTF   "40"                          CALL  "RELAY"
         JNT1  "23A"                         JMP   "31"
         JMP   "23"
                                     "30"    SEL   RB0
"23A"    JTF   "40"                          MOV   R0,  #1A
         JT1   "24"                          MOV   A,   @R0
         JMP   "23A"                         MOV   R2,  A
                                             INC   R0
"24"     STOP  TCNT                          MOV   A,   @R0
         SEL   RB1                           MOV   R3,  A
         MOV   R0,  #2A                      INC   R0
         MOV   @R0, #00                      MOV   A,   @R0
         CLR   F1                            MOV   R4,  A
         CLR   A                             CALL  "LATCH"
         MOV   R7,  #03                      RETR

"25"     CALL  "BIT"                 "31"    JMP   "0"
         JF1,  "31"
         DJNZ  R7,  "25"              "40"    MOV   R0,  #2A
         RRA                                  MOV   A,   @R0
         SWAP  A                              JNZ   "41"
         MOV   R2,  A                         CALL  "TAPESIG"
         MOV   R7,  #08                       JMP   "0"

"26"     CALL  "BIT"                 "41"    JMP   "6A"
         JF1   "31"
         DJNZ  R7,  "26"
         MOV   R3,  A
         MOV   R7,  #08

"27"     CALL  "BIT"
         JF1   "31"
         DJNZ  R7,  "27"
         MOV   R4,  A
         MOV   A,   R2
         XRL   A,   #01
         JZ    "28"
         MOV   A,   R2
         XRL   A,   #02
         JZ    "29"
         MOV   A,   R2
         XRL   A,   #04
         JZ    "32"
         MOV   A,   R2
         XRL   A,   #00
         JZ    "32"
         JMP   "31"
```

FROM FIG. 9B

| | | | | | | |
|---|---|---|---|---|---|---|
| "AD" | CLR | C | | "TRANS" | JB0, | "T1" |
| | CPL | C | | | ORL | P2, #01 |
| | CLR | A | | | CALL | "PHASE" |
| | MOV | @R0, A | | | ANL | P2, #FE |
| | MOV | R6, A | | | JMP | "T2" |
| | MOV | R7, #08 | | | | |
| | | | | "T1" | ANL | P2, #FE |
| "AD1" | MOV | A, R6 | | | CALL | "PHASE" |
| | RRC | A | | | ORL | P2, #01 |
| | MOV | R6, A | | | | |
| | ORL | A, @R0 | | "T2" | CALL | "PHASE" |
| | OUTL | BUS, A | | | RR | A |
| | JT0 | "AD2" | | | RETR | |
| | MOV | @R0 A | | | | |
| | | | | "TAPESIG" | MOV | R1, #2B |
| "AD2" | DJNZ | R7 "AD1" | | | MOV | A @R1 |
| | ANL | P2, #CF | | | JNZ | "TP1" |
| | RETR | | | | JT1 | "TP2" |
| | | | | | MOV | @R1 #01 |
| "LATCH" | MOV | A, R3 | | | | |
| | OUTL | BUS, A | | "TP1" | JNT1, | "TP2" |
| | ANL | P2, #BF | | | MOV | R1, #2C |
| | ORL | P2, #40 | | | MOV | @R1, #01 |
| | MOV | A, R4 | | | | |
| | OUTL | BUS, A | | "TP2" | RETR | |
| | ANL | P2, #7F | | | | |
| | ORL | P2, #80 | | "RELAY" | MOV | R2, #03 |
| | RETR | | | | | |
| | | | | "RY4" | MOV | R1, #1B |
| "PHASE" | MOV | R6, A | | | MOV | A, #01 |
| | MOV | A, #EC | | | MOV | T, A |
| | MOV | T, A | | | | |
| | STRT | T | | "RY3" | STRT | T |
| | | | | | | |
| "P1" | JTF | "P2" | | "RY1" | JTF | "RY2" |
| | CALL | "TAPESIG" | | | JMP | "RY1" |
| | JMP | "P1" | | | | |
| | | | | "RY2" | STOP | TCNT |
| "P2" | STOP | TCNT | | | DJNZ | R1, "RY3" |
| | MOV | A, R6 | | | ORL | P2, #0C |
| | RETR | | | | DJNZ | R2, "RY4" |
| | | | | | RETR | |

FROM FIG. 9C

```
"BIT"    RR    A
         MOV   R6,   A
         MOV   A,    #E3
         MOV   T,    A
         STRT  T

"B1"     JTF   "B2"
         JMP   "B1"

"B2"     STOP  TCNT
         MOV   A,    #FA
         MOV   T,    A
         STRT  T
         JT1   "B3"

"B5"     JTF   "B4"
         JNT1  "B5"
         JMP   "B6"

"B3"     JTF   "B4"
         JT1   "B3"
         JMP   "B6"

"B4"     STOP  TCNT
         MOV   A,    #F6
         MOV   T,    A
         STRT  T
         JT1   "B7"

"B8"     JTF   "B6"
         JNT1  "B8"
         MOV   A,    R6
         ORL   A,    #80
         JMP   "B9"

"B7"     JTF   "B6"
         JT1   "B7"
         MOV   A,    R6
         ANL   A,    #7F
         JMP   #B9"

"B6"     CPL   F1

"B9"     STOP  CNT
         RETR
```

FIG. 9D

AUDIOVISUAL SYSTEM WITH IMPROVED MOVING LIGHT POINTER

CROSS REFERENCE TO RELATED APPLICATION

U.S. patent application Ser. No. 114,998 entitled "Improved Servomechanism With Capacitive Position Sensor" filed on even date with this application and assigned to the same assignee as the present invention.

BACKGROUND OF THE INVENTION

This invention relates in general to audiovisual systems for recording and conveying information between people. More specifically, it relates to an improved automatic pointer apparatus that superimposes a highlighting spot on a sequence of visual images, moves the highlighting spot over each image under manual control in continuous coordination with the recording of an audio program, and records movement-controlling signals for subsequently automatically moving the highlighting spot on playback with the audio program.

A variety of audio and audiovisual systems record information presented by a speaker or operator and play it back to an audience of one or more people. One such audiovisual system is described in U.S. Pat. No. 4,146,314 that is assigned to the assignee of this invention. That patent discloses several forms of automatic pointer apparatus for moving a highlighting spot over visual images in close coordination with an accompanying recorded audio program. In this apparatus, a control device continuously and rapidly generates a series of electrical signal sets. Each signal set corresponds to a two-dimensional position that is selected manually by an operator. Specifically, the control device is handheld. The operator's movement of a control actuator on the control device, that may include a joy stick, a stylus, or even a finger, produces variations in the amplitudes of analog signals that form the signal sets.

Periodically the signal sets are sampled and converted into digital form and then converted into a frequency-shift-keyed form that is suitable for recording on a first, or control, track of a multiple track magnetic tape, along with control information that is also produced in freuqency shift keyed form. The recording of this information on the control track occurs simultaneously with the recording of the operator's spoken words or some other audio program on a second, or audio, track.

The frequency-shift-keyed signals are also reconverted simultaneously into digital form for driving stepping motors to position a pointer mechanism that projects the highlighting spot on the visual image. Thus, the highlighting spot follows the movement of the control actuator only after the signal sets from the control actuator are sampled, converted into frequency-shift-keyed form, and reconverted into digital form. During playback of the magnetic tape, the recorded signals in frequency-shift-keyed form from the control track on the tape are converted into digital form for driving the stepping motors so that the highlighting spot follows the signals recorded on the control track of the magnetic tape and thus retraces the path of the spot during the recording operation.

When a program is recorded with this apparatus, an operator must coordinate two distinct actions. The first is the spoken part of the program in which he records a prepared discussion of the visual images that are projected. The second is a projector control function that includes changing slides and, with the apparatus shown in the aforementioned patent, utilizing the control actuator to move the highlighting spot in conjunction with the oral presentation. As will be apparent, it is very desirable that this control function be quickly learned and become essentially automatic, or second nature. If it is not, the operator must, to a certain extent, concentrate on the control function. This detracts from his concentration on the audio function and can introduce interruptions, pauses, and repetitions in the audio program that detract from the overall effect of the program when it is played back.

It has been found that the apparatus disclosed in U.S. Pat. No. 4,146,314 could distract an operator during the recording of a program. One cause of the distractions seems to be the series of conversions of the signal sets from the control actuator to digital signals, to frequency-shift-keyed signals, and then back to digital signals for controlling the stepping motors. The conversions are based upon discrete samples of the analog signal sets from the control actuator, and each of the serial conversions requires a discrete time interval. Thus, there is a noticeable interval between the time the operator moves the control actuator to a new position and the arrival of the highlighting spot at a new position on a screen. Secondly, stepping motors were used to simplify the structure of the drive while still providing a low mass, inexpensive, reliable mechanism. However, stepping motors by definition "step" from one position to another, and this "stepping" operation also contributes a sense of discrete, jerky motions, especially when the stepping motors operate in response to the discontinuous signals that result from continuous movement of the control actuator.

SUMMARY

Therefore, it is an object of this invention to provide an automatic pointer apparatus for a sequence of projected visual images that moves a pointer image such as a highlighting spot continuously in close coordination with an accompanying recorded audio program.

Another object of this invention is to provide an automatic pointer apparatus that is of relatively low cost.

Still another object of this invention is to provide an automatic pointer apparatus that is rugged and highly reliable and, in particular, is not susceptible to malfunction due to random restart, noise, dropout, power loss, or tape speed variations.

Yet another object of this invention is to provide an automatic pointer apparatus that is adaptable to a variety of audio-visual media and in particular operates with any commonly used slide projector.

Still yet another object of this invention is to provide an automatic pointer apparatus that has a smooth and natural response to actuation of a manually controlled actuator.

Yet still another object of this invention is to provide an automatic pointer apparatus that facilitates the recording of an audio program by providing a natural means for moving and recording the motion of a highlighting spot.

In accordance with this invention, while a positioning control means, that may include a manually actuable controller, is used, it generates first positioning control signals in a first form. A mode selection means couples these first positioning control signals directly to a positioning means that responds by positioning a highlighting spot, or pointer image, with respect to a projected image. The control signals are also converted simultaneously into a second form that is adaptable for being recorded in conjunction with an audio program on the recording medium.

When the positioning control means is not being used, as when the recorded program is played back or the operator stops using the controller, the mode selection means couples second positioning signals of the first form from a second conversion means to the positioning means to control the position of the highlighting spot. The second positioning control signals are responsive to the recorded signals (during playback) or to the last position of the controller when the operator no longer actuates it while the operator is recording a program.

Conversion of the signals from the control means into a form for recording, in parallel with the coupling of these signals to the positioning means, provides a smoothly varying control signal for a servomechanism that moves the highlighting spot on the screen. Moreover, this direct response to movement of the positioning control occurs with no perceptible time delay.

This invention is pointed out with particularity in the appended claims. The above and further objects and advantages of this invention may be better understood by referring to the following description taken in conjunction with the accompanying drawings.

BRIEF DESCRIPTION OF THE DRAWINGS

FIG. 9 comprises FIGS. 9A through 9D that constitute an annotated instruction list of one program that implements the flow chart of FIGS. 8A through 8D in the microprocessor shown in FIG. 7;

DESCRIPTION OF AN ILLUSTRATIVE EMBODIMENT

A. Overall System

Figure 1:
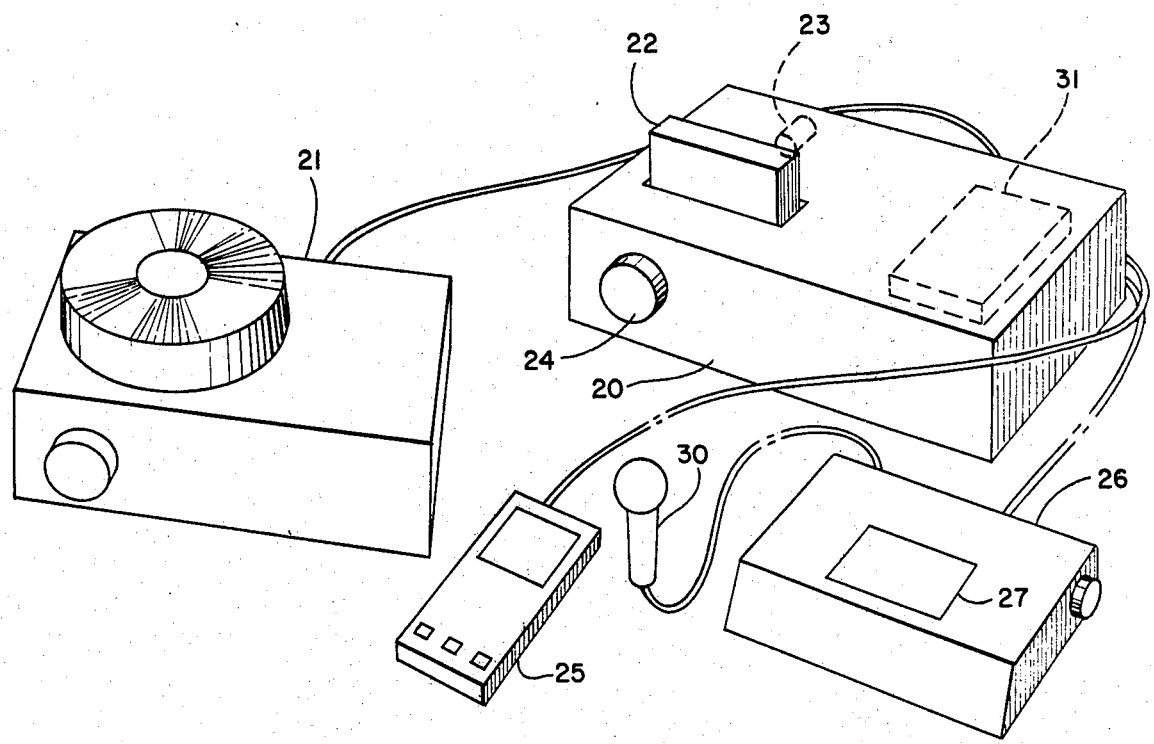
FIG. 1 is a simplified perspective view of an automatic pointer apparatus that is contained in a projection mechanism that is separate from a standard front screen slide projector and a recording-playback mechanism.

FIG. 1 depicts the application of this invention to an automatic, programmable pointer apparatus 20 that is separate from a conventional slide projector 21 that includes a connection to the apparatus 20. The apparatus 20 includes a pointer mechanism 22 that is illuminated by a projection lamp 23. A lens 24 projects the resulting highlighting spot onto the projection screen (not shown) when the projector 21 and apparatus 20 are aligned properly. A manual control device 25 provides input signals to the appartus 20 for manually controlling slide changes in the projector 21 and for generating signals that control the position of the highlighting spot. A conventional two-track cassette recorder 26 connects to the apparatus 20 and includes a cassette port 27. As previously indicated, one track receives the audio input from a microphone 30. The other track receives the signals produced when the operator moves the highlighting spot and changes slides. A control circuit 31 in the apparatus 20 controls the transfer of signals between the various elements shown in FIG. 1.

B. Control Device 25

Figure 2:
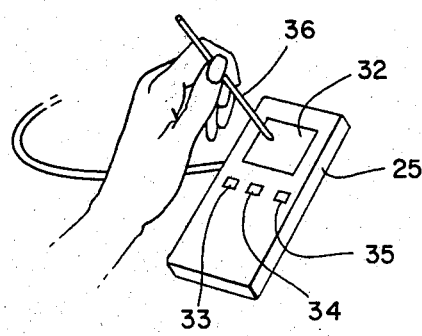
FIG. 2 is a perspective view of a hand-held device for the manual positioning of a highlighting spot generated by the apparatus shown in FIG. 1.

Referring to FIG. 2, the control device 25 is adapted to operate in conjunction with various electrical circuits to generate positioning control signals in an analog form that will enable a mechanism, such as the positioning mechanism 22 in FIG. 1, to position the highlighting spot in accordance with this invention. In this specific embodiment, the control device 25 includes a generally rectangular position transducer or pad 32 and three switches immediately below the pad 32. Switch 33 is actuated to produce a forward slide change. Pressure on switch 34 produces a reverse slide change. Pressure on switch 35 causes the spot positioning apparatus to move the highlighting spot to a reference or "home" position, as described in more detail later.

Such a pad can be hand-held. Although it is possible for an operator to actuate the pad 32 with finger pressure, FIG. 2 depicts a hand-held stylus 36 that may be pressed against the pad 32. In such an embodiment, the control device 32 could include a backing that would keep the device fixed on a flat surface.

Such transducer pads 32 as shown in FIG. 2 are well known devices. They are multilayer, position-transducing devices, whose electrical resistances, measured along vertical and horizontal directions, vary in response to the means position of the mechanical force compressing the layers. More specifically, a voltage is applied alternately across each dimension of the pad, e.g., vertically and horizontally. The pad acts as a potentiometer, with the stylus or thumb pressure being equivalent to a sliding contact on the potentiometer. The physical position of the pressure point on the pad, therefore, determines a resistance ratio of the pad in each of the horizontal and vertical directions. As described later, a voltage is switched alternately across the horizontal and vertical resistances in the pad to produce, with other circuitry, respective X and Y output analog pulse trains. The pulse amplitudes in each pulse train are determined by the corresponding resistance ratios and therefore correspond with the pressure position in the respective horizontal and vertical directions.

C. Control Circuit

Figure 3:
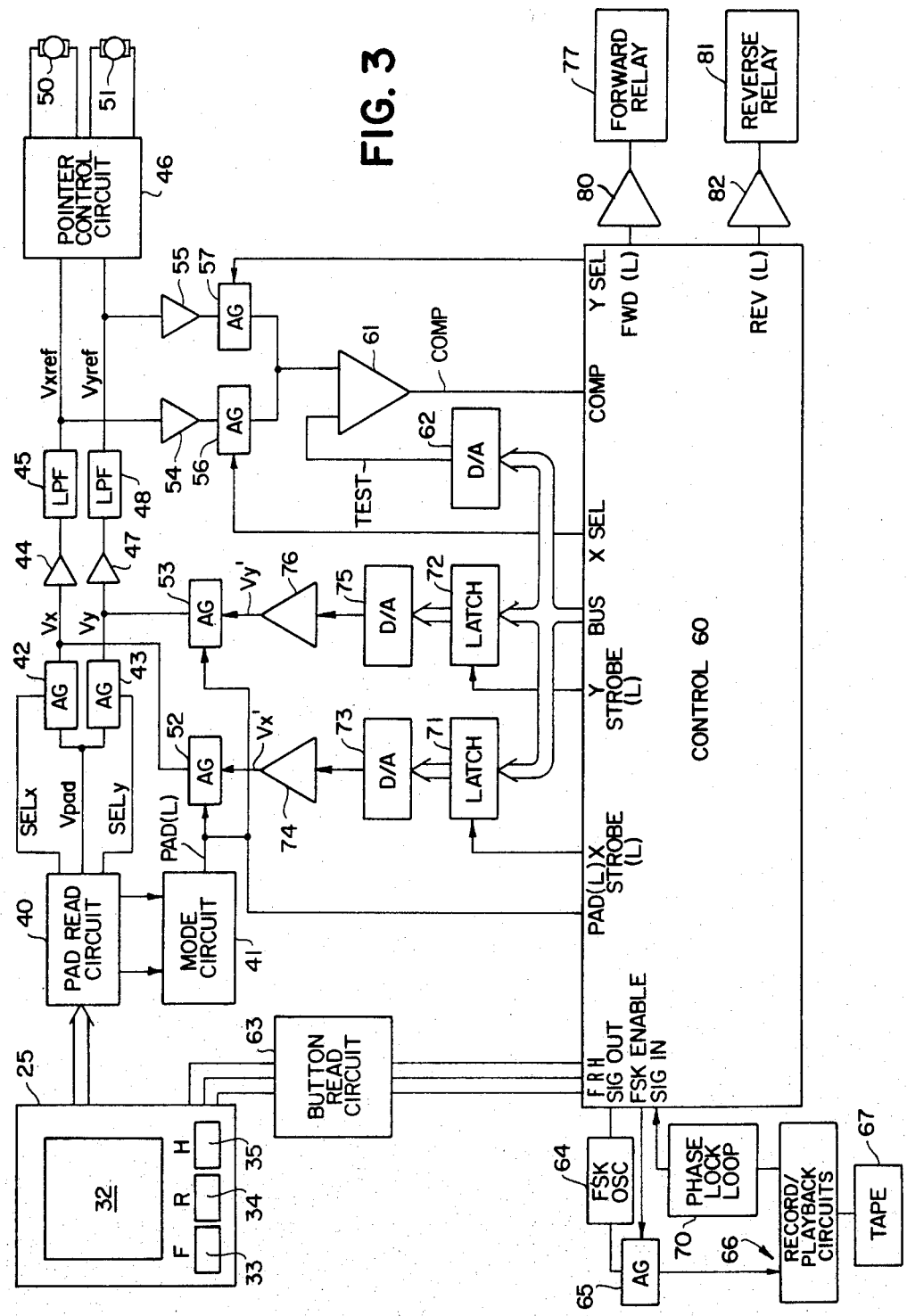
FIG. 3 is a functional block diagram of control circuitry for an automatic pointer apparatus according to this invention.
Figure 4:
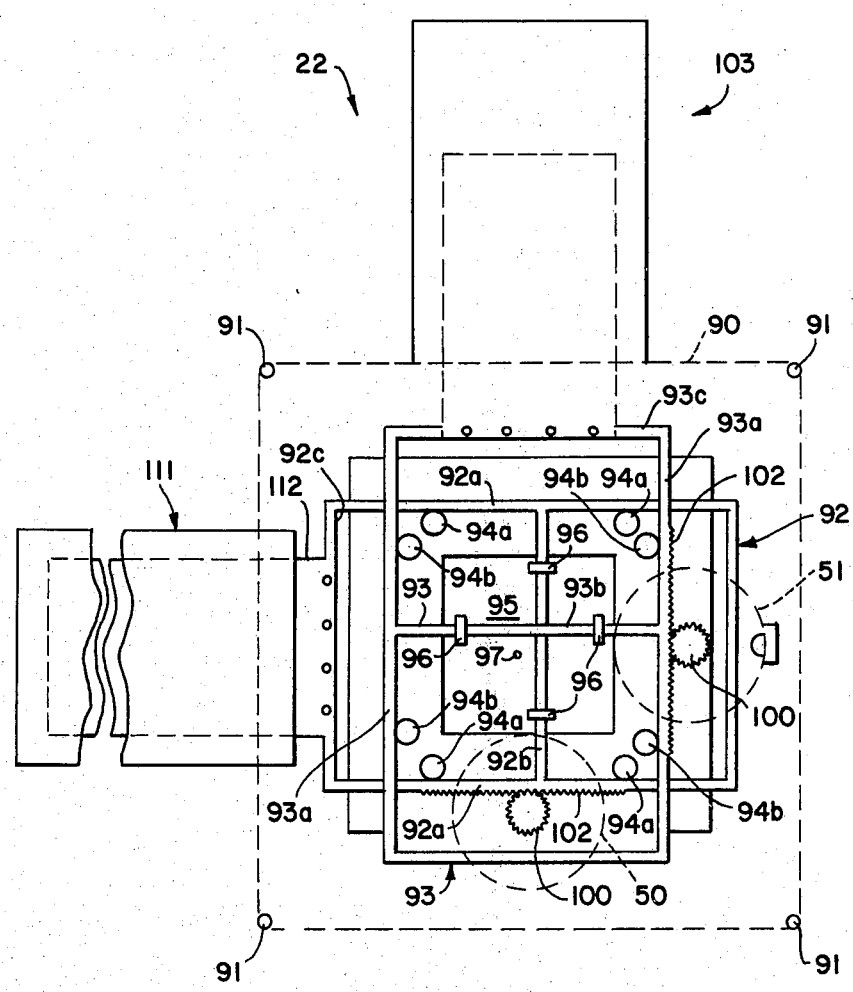
FIG. 4 is a view in front elevation of a preferred embodiment of a pointer mechanism for use with this invention.
Figure 5:
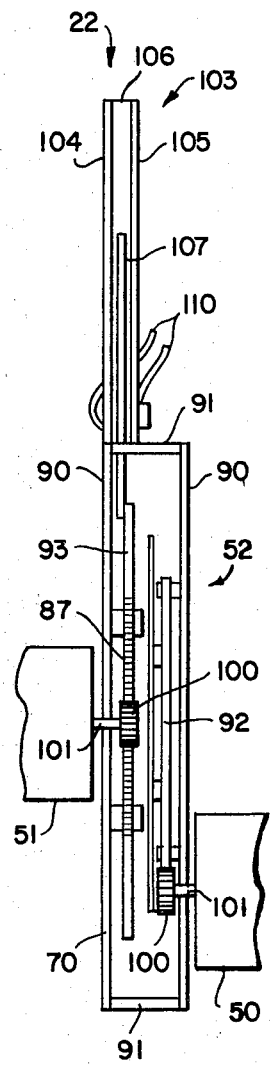
FIG. 5 is a side elevation of the pointer mechanism shown in FIG. 4.

When an operator activates the pad 32, control circuitry, shown in FIG. 3, develops signals that control the pointer mechanism 22 that is shown generally in FIG. 1 and in more detail in FIGS. 4 and 5. FIG. 3 depicts a control device 25 of the type shown in FIG. 2. The signals from the pad 32 are coupled to a pad read circuit 40 that responds to the input signals by generating SELx, SELy, and Vpad signals in analog form. Thus, the pad 32 and pad read circuit 40 constitute portions of a position control means that generates first positioning control signals in a first, or analog, form. These circuits are described later in more detail.

A mode circuit 41 is an element in a mode selection means that also includes analog gates 42 and 43 that connect to the pad read circuit 40. The circuitry asserts a PAD signal any time the operator applies pressure to the pad 32. In this specific embodiment the signal is designated as a PAD(L) signal; the "(L)" indicates that when the PAD signal is logically true, the PAD(L) signal will be at a low, or ground, potential. The PAD signal, when asserted, enables analog gates 42 and 43 to couple Vpad signals as Vx and Vy signals, respectively, to a pointer control circuit 46. An amplifier 44 and a low pass filter 45 couple the Vx signals to the pointer control circuit 46 as a Vxref signal; an amplifier 47 and low pass filter 48 couple the Vy signals to the pointer control circuit 46 as Vyref signals. Thus, when an operator applies pressure to the pad 32 and Vx and Vy positioning control signals are coupled directly to the pointer control circuit 46 as reference signals for controlling DC servomotors 50 and 51 respectively. When the AD signal is not asserted, analog gates 52 and 53, also in the mode selection means, couple Vx' and Vy' signals, respectively, to the pointer control circuit 46 as second positioning control signals so as to maintain reference inputs for the circuit 46. The source of these second positioning control signals is described later.

Other circuitry in FIG. 3 converts signals (i.e., the Vxref and Vyref signals) corresponding to first positioning control signals from the pad read circuit 40 into a frequency modulated form that is adapted to be recorded on the control track of a magnetic tape in a cassette that is placed in the recorder 26. More specifically, amplifiers 54 and 55 couple signals in analog form from the outputs of the filters 45 and 48 respectively to analog gates 56 and 57 that are controlled by X SEL and Y SEL signals, respectively, from a control 60. A comparator 61 thus alternately compares the Vxref and Vyref signals with analog feedback signals from a digital-to-analog (D/A) converter 62 as part of a first conversion process during which each set of sampled analog signals is converted into X and Y position control bytes in digital form. The control 60 also converts signals from a button read circuit 63 into a header control byte in digital form. These three control bytes are then combined into a 3-byte word that is transferred serially, by bit, into a frequency-shift-keyed oscillator 64 that converts each control word into a sequence, or burst, of frequency-shift-keyed signals that are particularly well adapted for being recorded on magnetic tape. An analog gate 65, that the control 60 enables, couples the burst of frequency shift keyed signals to a recording input of record/playback circuits 66 in a conventional tape recorder to be recorded on a tape 67 when the circuits 66 are in their recording mode. Obviously, if the circuits 66 are not in their recording mode, the signals will not be recorded on the tape 67.

Thus, when the operator uses the pad 32, the signals from the pad read circuit 40 are coupled directly, without conversion, to the pointer control circuit 46 as position reference signals that are used by servomechanisms to control the motors 50 and 51 and thereby position the highlighting spot. If the operator has the circuits 66 in a recording mode, bursts of signals corresponding to the analog signals, in a frequency-shift-keyed form, are recorded with other control information, on one track, as a control track of the magnetic tape, concurrently with any audio information that is being recorded on another track as a program track. This design eliminates encoding and decoding delays that were encountered in the prior design whenever the operator used the control device to position the highlighting spot.

Conversion circuitry for converting the recorded signals from the tape back to analog positioning signals includes a phase lock loop 70. It produces, in serial form, a sequence of digital signals that corresponds to the recorded frequency-shift-keyed information. These signals are fed to the control 60 for decoding and control of the appropriate responses.

When the control 60 decodes each control word from the control track, it forms the header and X and Y position control bytes in digital form and routes these signals to appropriate outputs. For example, the X and Y position control bytes move through an output port to latches 71 and 72 in response to X STROBE(L) and Y STROBE(L) signals, respectively. The latch 71 receives successive X position control bytes which are converted into an analog form by a D/A converter 73. An amplifier 74 couples an amplified analog signal to the analog gate 52 as a Vx' signal that corresponds to the digital value transferred into the latch 71 and thus also to the recorded Vref signal. A digital-to-analog (D/A) converter 75 and amplifier 76 convert the successive Y position control words into a Vy' analog signal corresponding to the recorded Vyref signal and apply this signal to the analog gate 53.

Whenever the PAD signal is not asserted, the analog gate 52 couples the Vx' signal to the amplifier 44 and low pass filter 45. Similarly the analog gate 53 couples the Vy' to the amplifier 47 and the low pass filter 48. Thus, the digital-to-analog converters 73 and 75, and the amplifiers 74 and 76 are components of a second conversion means that provides position control signals that control the position of the highlighting spot.

The second conversion means can also produce the position control signals during recording. At various times during recording, the operator may move the spot to a particular location and then remove his finger or stylus from the pad 32. This is known as a "park" mode, during which the highlighting spot should not move. As described in more detail later, the digital bytes in the latches 71 and 72 always correspond to the last position of pressure. Thus, when the operator removes pressure from the pad 32, the analog gates 52 and 53 couple to the pointer control circuit 46 a series of Vx' and Vy' signals corresponding to the last pressure position. These signals supplant the Vx and Vy signals that are derived from the pad read circuit 40. Thus, the highlighting spot does not move until the operator again uses the pad 32 or, as now will be described, changes a slide or presses the button 35 to produce a homing operation.

Still referring to FIG. 3, the button read circuit 63 produces an "F" signal when the operator presses the button 33 on the control device 25. This corresponds to a command for producing a forward slide change and the control 60, in response, energizes a forward relay circuit 77 through an amplifier 80, thereby to change the slide by using conventional means to advance the slide mechanism such as is shown in the slide projector 21 in FIG. 1. Similarly, if the operator pushes the button 34, the button read circuit 63 produces an "R" signal. The control 60 energizes a reverse relay circuit 81 through an amplifier 82 to produce a reverse slide change. When the operator activates the button 35, the button read circuit 63 produces an "H" signal. The control 60 responds to the "H" signal, and also to either slide change command, by causing the highlighting spot to move to a "home," or reference, position. Whenever any one of these button is pressed, the control 60 produces a corresponding header control byte for recording on the control track with X and Y position bytes that identify this home position.

D. Pointer Mechanism

Still referring to FIG. 3, the pointer control circuit 46 includes servomechanism control circuits that control servomotors 50 and 51 to move the pointer mechanism 22 of FIG. 1. One pointer mechanism that can be used with the motors 50 and 51 is shown in FIGS. 4 and 5. The illustrated pointer mechanism 22 has a generally square configuration defined by a pair of spaced, parallel, plates 90, 90, formed of an optically transparent material such as plexiglass. Four posts 91 secure and space the plates 90, 90. A pair of rectangular frames 92 and 93 are mounted between the plates on sets of idler rollers 94a and 94b rotatably secured to the plates 90, 90. Two rollers 94a engage the inner edge of each longitudinal frame member 92a thereby supporting the frame 92 for movement horizontally in FIG. 4. Similarly, two rollers 94b engage the inner edge of each lengthwise frame member 93a to support the frame 93 for movement in the vertical direction in FIG. 4. The horizontal or "X" frame 92, therefore, moves horizontally and the vertical or "Y" frame 93 moves vertically.

Each frame 92, 93 has a transverse cross member 92b and 93b, respectively, that supports a thin, opaque mask 95 by engaging the mask under a set of slide loops 96 projecting from the mask 95. The two loops on a given cross member move the mask with the associated frame, while the other two loops slide along the cross member on the other frame. Simultaneous movement of both frames moves the mask along any arbitrary path. The mask 95 contains a central aperture 97, that defines the pointer image when illuminated by a light source (e.g., the light source 23 in FIG. 3). The aperture 97 is shown as a circular hole which produces a circular highlighting spot on the viewing screen. Thus movement of the frames 92 and 93 provides corresponding movement of the mask 95 and the spot of light projected through the aperture 97 onto the screen.

The servomotors 50 and 51 drive the two frames 92 and 93 respectively. Each motor drives its corresponding frame through a pinion 100 mounted on a motor drive shaft 101 rotatably mounted in a plate 90. Each pinion 100 meshes with a toothed rack 102 formed on an associated frame member 92a or 93a. Rotation of a motor shaft 101 is thus transformed into longitudinal translation of the associated frame.

The foregoing basic mechanical structure was disclosed in U.S. Pat. No. 4,146,314, but was driven by stepping motors. This met the requirements for low mass and low moving friction that assure that a pointer mechanism responds quickly and reliably to changes in desired pointer position. These requirements also can be met with a circuit that utilizes the DC servomotors 80 and 81. As apparent, however, such a servomotor must include a position sensor for generating a frame position signal in order to complete a servo loop that controls the servomotor.

A simple, reliable and inexpensive position transducer is also shown in FIGS. 4 and 5. For the vertically moving frame 93, this transducer is designated by reference numeral 103. It contains two spaced conductor plates 104 and 105 that mount to the top frame 91. A cross member 106 at the top supports the outer ends of the plates 104 and 105 in a parallel relationship.

A preferably rectangular dielectric plate 107 is affixed to a cross-member 93c across the top of the frame 93 and moves vertically with the frame 93, between the plates 104 and 105. The dielectric plate 107 can comprise any insulating material. An insulating substrate used to construct printed circuit boards and cut to the proper dimension has been found to provide excellent results. Conductors 110 connect the plates 104 and 105 to a "Y" servo control circuit (FIG. 10) that controls the vertical movement of the frame 93.

Plates 104 and 105 and the dielectric plate 107 constitute a variable capacitor in which the capacitance represents the position of the frame 93. Signals on the conductors 110 thus constitute vertical frame position signals that are inputs to the servo control circuit for positioning the frame 93. This structure is relatively insensitive to transverse mispositioning of the dielectric plate 107. In fact, it has been found that the plate 107 can actually touch one or the other of the plates 104 and 105 without affecting the positioning accuracy of the servo control circuit.

It should be noted that with a rectangular shape for the dielectric plate 107 and movement of the plate along a longitudinal axis thereof, i.e. parallel to a side of the rectangle, the capacitance of the transducer is linearly related to the vertical position of the frame 93.

A similar position transducer 111 is associated with the horizontally moving frame 92. Specifically, a dielectric plate 112 is affixed to the left frame member 92c.

With this understanding of the overall construction and operation of this invention, it will be helpful to describe certain portions of the controller shown in FIG. 3 in more detail by referring to a specific controller embodiment.

1. Pad Read Circuit 40

Figure 6:
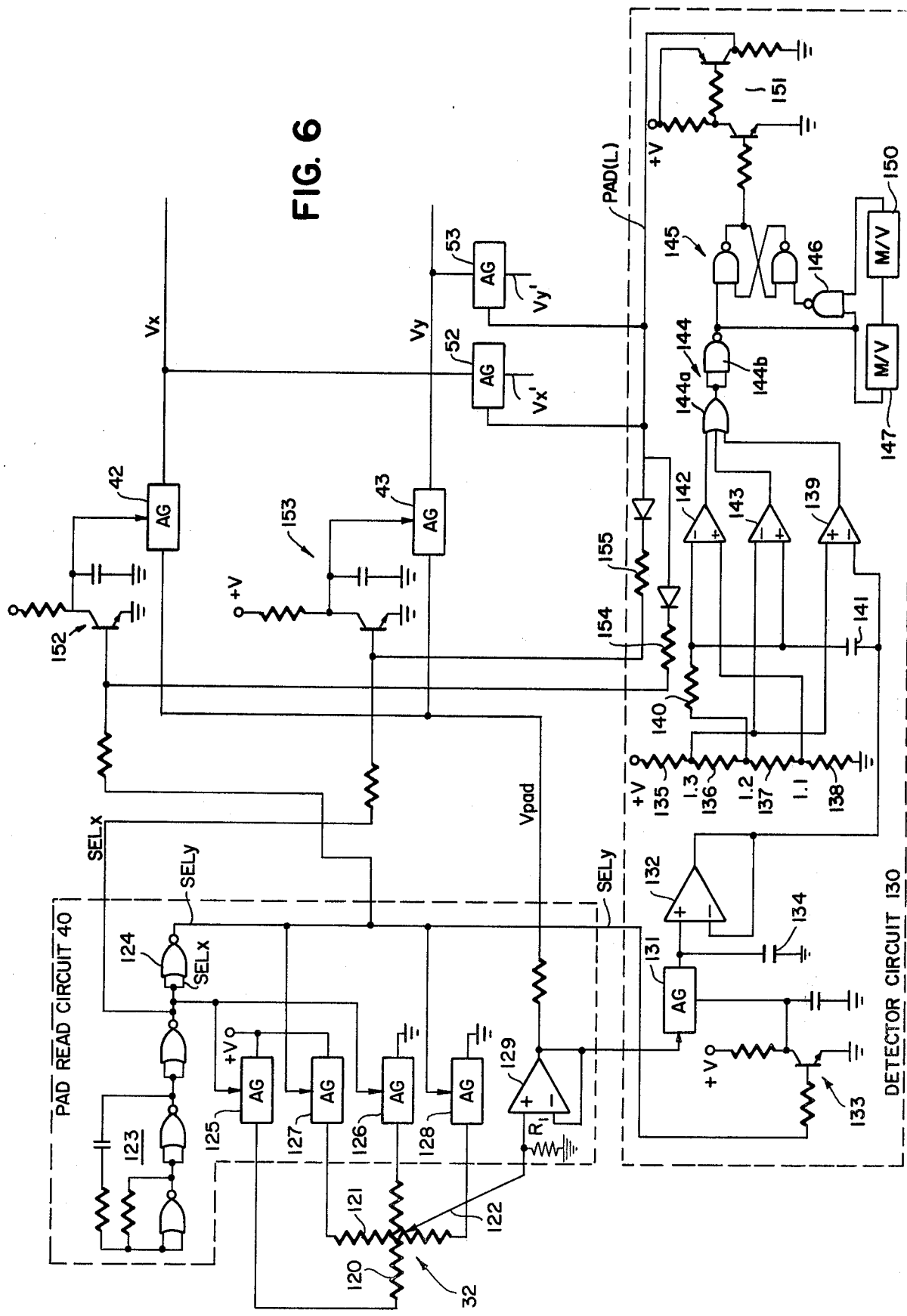
FIG. 6 is a detailed circuit diagram of pad read and mode selection circuits that are shown in FIG. 3.

Now referring to FIG. 6, the pad 32 is depicted as comprising a horizontal position resistor 120, a vertical position resistor 121 and a slider 122. Pressure on the pad establishes the point at which the slider 122 contacts each of the resistors 120 and 121.

Circuitry in the pad read circuit 40 alternately impresses a voltage on the resistors 120 and 121. A clock 123 comprising NOR gates, a feedback capacitor and feedback resistors, produces a train of SELx square-wave clock pulses. A NOR gate 124 produces a complementary train of SELy pulses. The SELx pulses alternately open and close a gating circuit comprising analog gates 125 and 126 thereby to alternately energize and deenergize the resistor 120. Similarly, the SELy pulses alternately open and close another gating circuit comprising analog gates 127 and 128 thereby to alternately energize and deenergize the resistor 121. As a result, there is impressed on the slider 122 a pulse train in which alternate pulses correspond to the X and Y position resistors 120 and 121 and the amplitude of each pulse corresponds to the position of the slider 122 and hence the pressure point on the pad 32. That is, the X and Y position signals are multiplexed into the slider 122. When no pressure is exerted on the pad 32, the slider 122 open circuits and its potential goes to ground by way of a high impedance resistor $R_1$.

A buffer amplifier 129 applies a Vpad signal corresponding to the slider signal to the inputs of the analog gates 42 and 43 that are in the mode selection means. The Vpad signal also is coupled to the input of a detector circuit 130, specifically to an analog gate 131 that couples the Vpad signal to an input amplifier 132 each time the SELy pulse that is received by an inverter-buffer amplifier 133 shifts to a nonasserted state. Thus, when the pad 32 is actuated, the output of the gate 131 is a periodic series of pulses whose heights correspond to the position of the slider 122 along the horizontal position resistor 120. A capacitor 134 smooths the input of amplifier 132 sufficiently to eliminate the pulse nature of this signal from the following detector circuit 130. When the pad 32 is not actuated, the Vpad signal and thus the output of gate 131 goes to a low or ground potential since the slider potential is also at ground.

The detector circuit 130 asserts the PAD signal whenever the signal from the amplifier 132 is above a predetermined minimum value and the signal is stable. A string of resistors 135 through 138 establishes a set of reference voltages. Typical reference voltage values are annotated on FIG. 6. An operational amplifier 139 detects signals below the predetermined minimum. A resistor 140 and capacitor 141 act as a differentiator that supplies an input signal to operational amplifiers 142 and 143. Signals from the amplifiers 142 and 143 indicate signal instability in negative and positive directions, respectively.

When the pad 32 is not activated by an operator, the output from the amplifier 139 is at a high level while the output signals from the amplifiers 142 and 143 are at low levels. A NOR circuit 144 comprising an OR gate 144a and a NAND gate 144b, therefore clears a latch 145 and disables a NAND gate 146 that also is controlled by multivibrators 147 and 150 that are inactive. When the latch 145 is cleared, its output signal turns on a buffer amplifier 151 so the PAD(L) signal is at a high level; that is, the PAD signal logically is false, or not asserted.

When the operator initially activates the pad 32, the signal from the amplifier 132 will eventually exceed the predetermined minimum value and the output signal from the amplifier 139 will shift to a low level. However, initially the changing nature of the signal will cause one of the amplifiers 142 and 143 to produce a high level signal, so the output of the NOR circuit 144 will continue to clear the latch 145 so the PAD signal remains at a nonasserted state. When the signals do become stable, the output from the NOR circuit 144 shifts to a high level, but the NAND gate 146 does not provide a setting signal until after a time delay that is determined by the multivibrators 147 and 150. The delay prevents assertion of the PAD signal in response to noise or various other transient signals.

After the delay, the multivibrator 150 energizes the NAND gate 146 and the latch 145 sets. This turns off the amplifier 151, so the PAD(L) signal shifts to a low level that is the asserted level (i.e., the PAD signal is now logically true). If a transient beyond the specified range occurs thereafter, the output of the NOR circuit 144 shifts to a low level and immediately clears the latch 145. This shifts the PAD(L) signal to a nonasserted level until the transient passes. Thus, the PAD(L) signal is relatively immune from noise signals, especially those that can emanate from the pad 32.

The assertion of the PAD signal disables the analog gates 51 and 53 so they isolate the Vx' and Vy' from the pointer control circuit 46 (FIG. 3). It also enables the analog gates 42 and 43 to demultiplex the position signals on the slider 122. More specifically, the multiplexed Vpad signal pulse train is applied to the inputs of both the analog gates 42 and 43. A transistor switching circuit 152 controls the conduction of the analog gate 42; a circuit 153, the analog gate 43. If the PAD signal is logically false, the PAD(L) signal is high. This overrides the other inputs to circuits 152 and 153 and forces the switching circuits 152 and 153 to ground the control inputs to the analog gates 42 and 43 respectively, thereby disabling those gates. At the same time, however, it enables the analog gates 52 and 53 to couple the Vx' and Vy' signals to the pointer control circuit 46 in FIG. 3.

When the PAD signal is logically true, the overriding signal from the amplifier 151 stops, so the SELx and SELy signals control conduction through the switches 152 and 153. Specifically, when the SELx signal is asserted, i.e., is high, the output of the switching circuit 153 is low, thereby disabling the gate 43. At the same time, the SELy signal is low, thereby enabling the gate 42. This occurs at the same time that the pad resistor 120 is energized, and the gate 42 thus passes a Vx horizontal position signal from the slider 122. During the next half cycle of the clock 123, the connections are reversed. The gate 42 is disabled and the gate 43 is enabled, so as to pass a Vy vertical position signal resulting from energizing of the pad resistor 121. Thus, this circuitry demultiplexes the multiplexed Vpad signals when the PAD signal is logically true.

Summarizing the operation of the pad read circuit 40 and the mode circuit 41, when the operator actuates the pad 32, the mode circuit 41 generates a PAD signal. This enables the pad read circuit 40 and the analog gates 42 and 43 to produce Vx and Vy pulse trains. The amplifiers 44 and 47 (FIG. 3) and the low pass filters 45 and 46 smooth these pulse trains into analog position reference signals (i.e., Vxref and Vyref signals) for the pointer control circuit 46. When the PAD circuit is not asserted, the analog gates 52 and 53 conduct the Vx' and Vy' signals to the amplifiers 44 and 47, respectively.

As previously indicated, the detector circuit 130 in FIG. 6 also compensates for the considerable noise often encountered with pads of the type illustrated. This noise, which is in the form of negative- and positive-going pulses in the pad output voltage can result in unduly fluctuating Vx and Vy signals (FIGS. 3 and 6) with consequent erratic movement of the pointer image when the pointer control circuit 46 responds to these signals. The detector circuit 130 prevents response to such transient conditions by turning off the PAD signal immediately. This forces the control into the park mode and interrupts the Vx and Vy signals. Specifically, if the signal on the slider 122 experiences a positive-going transient of more than a predetermined amount, the voltage at the non-inverting input terminal of the amplifier 143 will momentarily exceed the voltage at the inverting input terminal of that amplifier, with a shift on the signal from the NAND gate 144b to a low level, thereby indicating the lack of an acceptable signal from the pad 32. Similarly a negative-going transient of more than a predetermined magnitude will reduce the voltage at the inverting input terminal of the amplifier 142 below the reference level at the non-inverting input terminal of that amplifier. The resulting output of the amplifier again results in a momentary change to the output of the NAND gate 144b.

The immediate response of the latch 145 causes an the PAD(L) signal to shift to a high level thereby to shift the control to the park mode. During this interval, the inputs to the pointer control circuit 46 (FIG. 3) are switched to the converters 73 and 75. The projected spot thus stops at its last position before the occurrence of the transient and remains there until cessation of the transient condition. This avoids undesirable "dancing" of the spot in response to transients. At the same time, it avoids slowing of the response of the spot position to pad 32 activation, which would be the case if such transients were eliminated by the more conventional use of a low-pass filter.

2. Control 60

Figure 7:
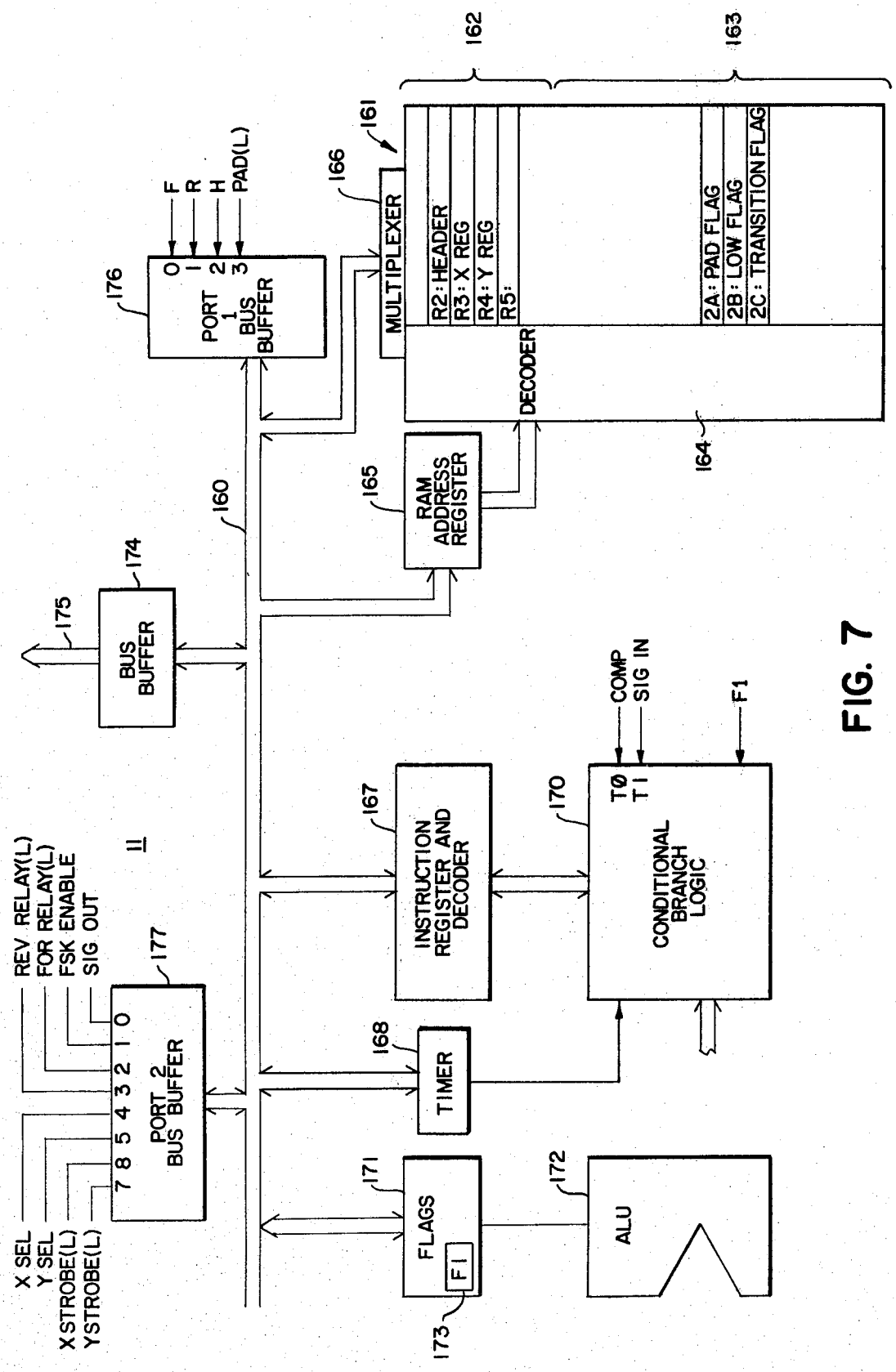
FIG. 7 is a block diagram of a specific embodiment of the control depicted in FIG. 3 that comprises a microprocessor.

In one embodiment of this invention, the control 60 comprises a microprocessor, such as an Intel 8048 or similar microprocessor. FIG. 7 schematically depicts certain elements that are contained in the microprocessor, including storage registers and random access memory locations. The correspondence between functionally designated terminals in FIG. 3 and actual terminals that are found in the microprocessor is also set forth in FIG. 7. This figure is particularly useful in understanding the operation of the control 60 when the microprocessor is programmed in accordance with the flow chart shown in FIGS. 8A through 8D and the instruction list of FIGS. 9A through 9D.

Now referring to FIG. 7, various elements in the microprocessor connect to a bus 160. One element is a memory 161. The memory 161 includes general purpose registers 162 and random access storage locations 163. A decoder 164 receives address information from a RAM address register 165 that connects to the bus 160. The decoder 164 selects a corresponding one of the registers 162 or storage locations 163 in response to the signals from the address register 165. A multiplexer 166 transfers instructions and operands between the bus 160 and selected ones of the registers 162 and storage locations 163. In the following discussion, storage locations 163 are addressed with hexadecimal numbers.

An instruction register and decoder element 167 and a timer 168 connect between the bus 160 and a conditional branch logic circuit 170. Signals also are coupled from the conditional branch logic circuit 170 to the instruction register and decoder 167. Three specific signals that are coupled to the circuit 170 include the COMP and SIG IN signals (FIG. 3) and an F1 error signal. A flags circuit 171 in FIG. 7 connects to an arithmetic-logic unit (ALU) 172 and includes a programmably controlled error flag F1, designated by reference numeral 173. The F1 error signal can be tested in response to specific instructions. The COMP signal, from the amplifier 61 in FIG. 3, and the SIG IN signal, from the phase lock loop 70, are coupled to T and T1 testable inputs, respectively, in the logic circuit 170.

A bus buffer element 174 couples the bus 160 to an input-output bus 175. This bus extends from the output port of the control 60 in FIG. 3. A port 1 bus buffer 176 receives, at 0 through 3 inputs respectively, the F, H, and R signals from the button read circuit 63 and the PAD(L) signal from the mode circuit 41 in FIG. 3. A port 2 bus buffer 177 operates as an output buffer for the control 60. The correspondence of individual conductors (i.e., 0 through 7) from the port 2 bus buffer 177 with the specific output signals shown from the control 60 is indicated in FIG. 7.

The structure and operation of the Intel 8048 and similar microprocessors are well known in the art. Therefore, no further description of the construction and/or operation of the microprocessor is necessary except as it pertains to the specific use of this microprocessor in connection with this invention.

Figure 8A:
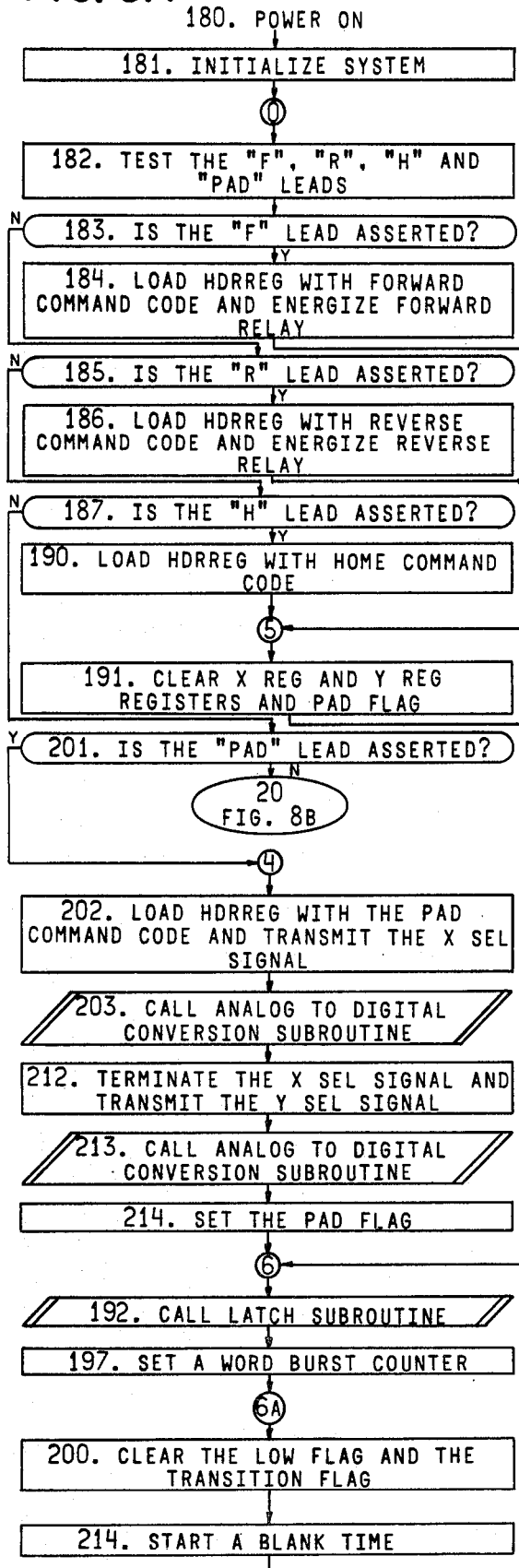
FIG. 8 comprises FIGS. 8A through 8D that constitute a flow chart of operations that the microprocessor shown in FIG. 7 performs in implementing one embodiment of this invention.
Figure 8A:
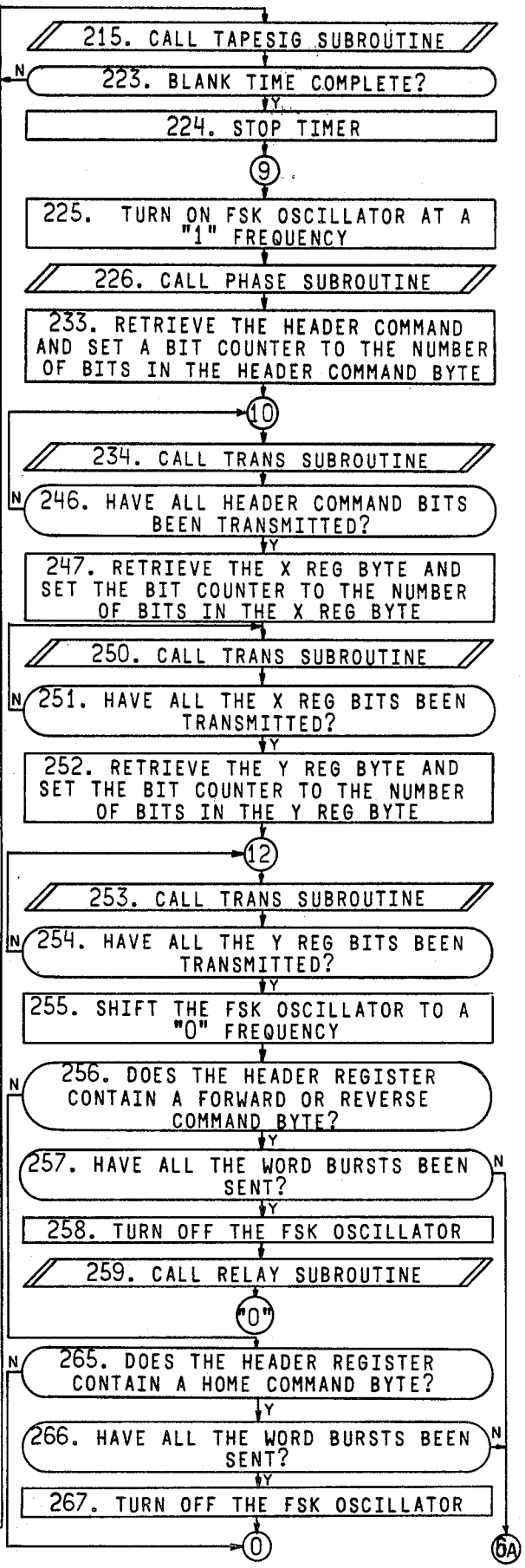
Figure 8B:
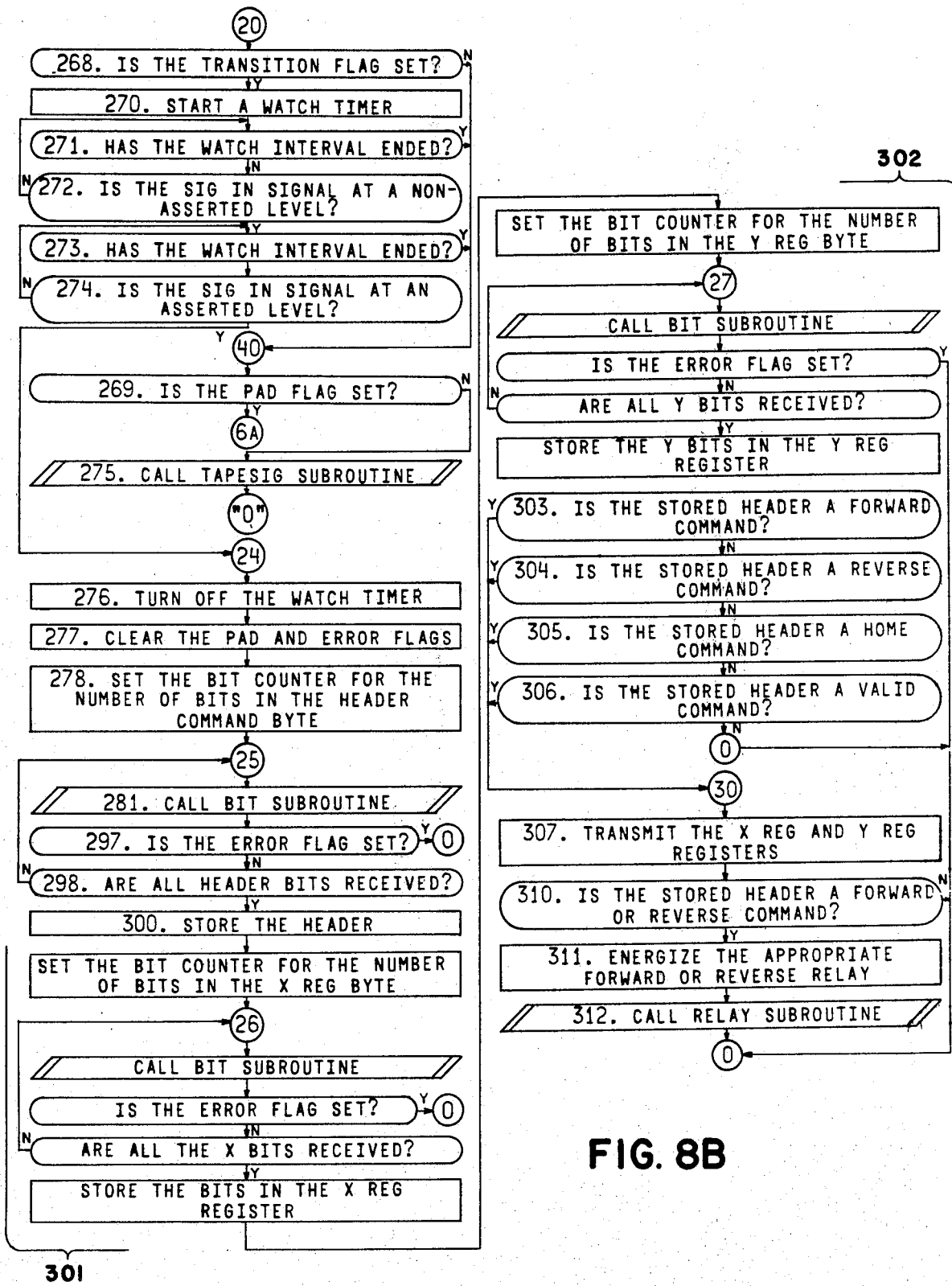

FIG. 8A is a first of four sheets of a flow chart that can be used as a basis for programming any microprocessor. FIG. 9A comprises a set of instructions that implements this sheet of the flow chart in this specific microprocessor. General correspondence between the instructions and individual blocks or groups of blocks shown in FIG. 8 is indicated by the appearance of corresponding symbolic addresses in circles in each of FIGS. 8A through 8D and FIGS. 9A through 9D. Further discussion of FIGS. 9A through 9D is not necessary.

The control 60 in FIGS. 3 and 7 begins to operate when power is applied. The application of power produces an interruption routine, designated as a "power on" step 180. Then the control processes an initialization routine 181. Thereafter, the control 60 tests the F, R, H, and PAD leads in step 182 to determine whether the operator is using the pad 32 on the control device 25 and whether it is necessary to form header and position control bytes. If the F lead is asserted (step 183) the control 60 transfers a forward command header control byte (a data value "01" in hexadecimal) to a header register, the R2 register in the registers 162, and energizes the forward relay 77 in FIG. 3 (step 184). Likewise, if the R lead is asserted (caused by pressing button 34 in FIG. 3), the control 60 transfers a reverse command header control byte ("02") into the R2 register and energizes the reverse relay 71 in FIG. 3 (steps 185 and 186). When the operator actuates the home button 35 in FIG. 3, the control 60 transfers a home command header control byte to the header register (steps 187 and 190). If any of these three leads is energized, the control 60 also forms the X and Y position control bytes by clearing X and Y registers (the R3 and R4 general purpose registers 162) and also clears a pad flag that is stored in storage location "2A" by the random access storage locations 163 shown in FIG. 7 (step 191 in FIG. 8A).

The control 60 then uses step 192 to call a latch subroutine that sequentially couples the contents of the X REG and Y registers 162 (i.e., the values of 00 in each of the cleared registers) through the bus buffer 174 (FIG. 7) to the respective latches 71 and 72 in FIG. 3. This latch subroutine is shown in FIG. 8C.

Figure 8C:
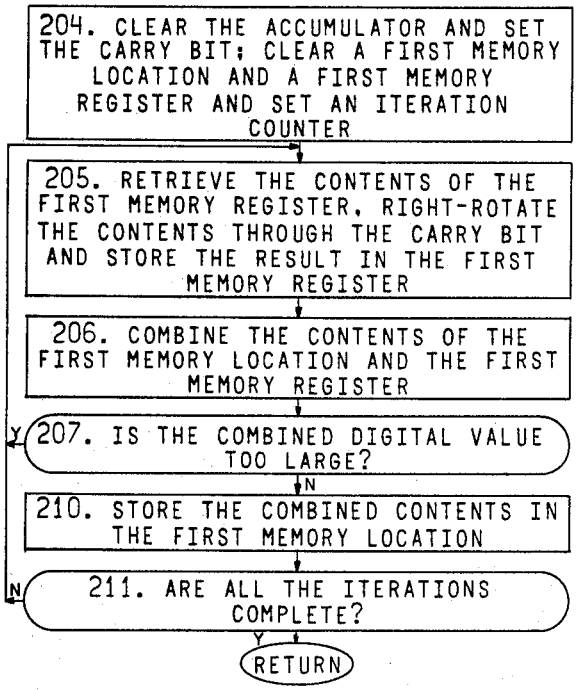
Figure 8C:
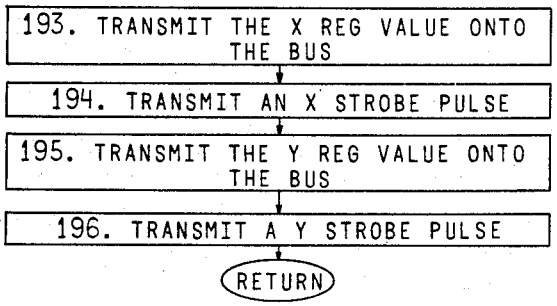
Figure 8C:
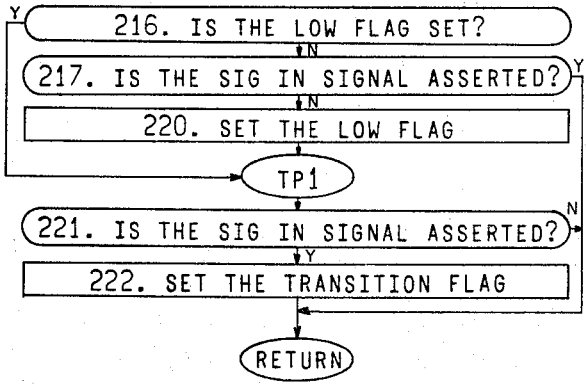
Figure 8C:
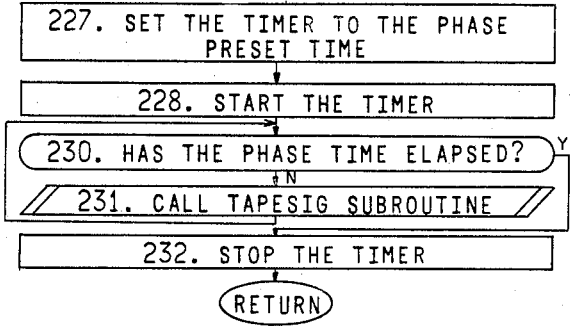
Figure 8C:
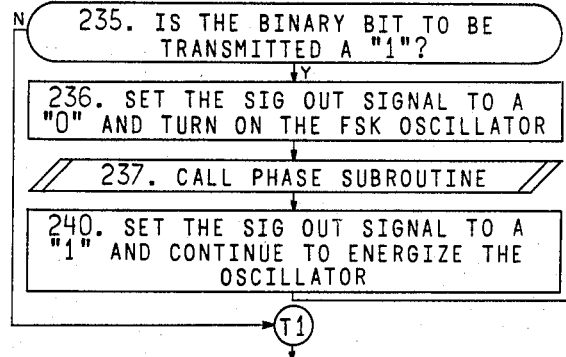
Figure 8C:
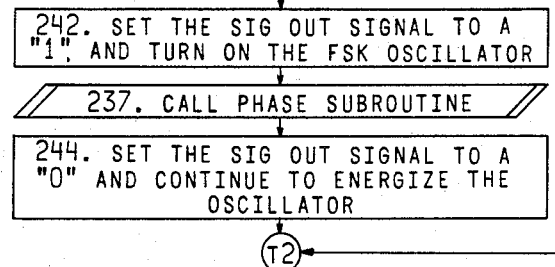
Figure 8C:
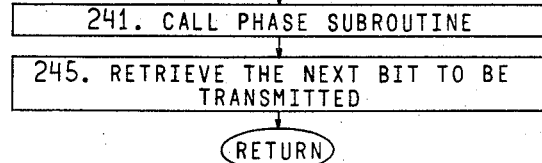
Figure 8C:
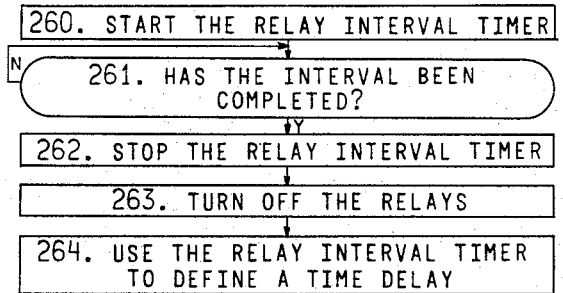

More specifically, in step 193 of FIG. 8C the control 60 transfers the contents of the X REG register through the bus buffer 174 and asserts an X STROBE pulse at the port 2 bus buffer 177 in step 194. The latch 71 thereby receives the X value. Steps 195 and 196 in FIG. 8 cause an analogous transfer from the Y REG register in FIG. 7 to the latch 77 in FIG. 3. Clearing the X and Y registers forces the highlighting spot to a "home", or reference, position. Thus, the highlighting spot moves to the home position each time a slide is changed or the operator presses the home button 35.

When this latch subroutine has been completed, the control 60 returns to step 192 in FIG. 8A to set a word burst counter that will cause plural, identical control words to be recorded. This will provide more reliable decoding of the signals from the tape during playback. Then the control 60 branches to a step 200 that is described later.

If the operator actuates the pad 32, the PAD signal is asserted at step 201 in FIG. 8A. During each sampling operation when this condition exists, the control 60 transfers a value corresponding to a pad command to the header register and transmits the X-SEL signal (step 202) thereby to couple the Vxref signal from the low pass filter 45 in FIG. 3 through the analog gate 56 to the comparator 61. In step 203 the control 60 converts the signal to a digital value by a conventional analog-to-digital subroutine that is shown in FIG. 8C.

The analog-to-digital subroutine uses step 204 to load a "1" into a most significant bit position in step 205 to form a test number. This subroutine transfers this test number through the digital-to-analog converter 62 (FIG. 3) to produce a TEST signal. The comparator 61 asserts the COMP signal if the signal from the converter 62 is greater than the signal from the analog gate 56. If the COMP signal is asserted, the test number is too large, so the control 60, in step 205, changes the most significant bit position to a "0" and a "1" is inserted in the next most significant bit position. Otherwise the "1" remains in the most significant bit position (step 210). This process iterates until all the bit positions of successively less significance in the test number are tested (step 211).

Once the digital value has been obtained, the test number, which is the X position control byte that represents the Vxref signal, is stored. When the process is complete, the X-SEL signal terminates and the control 60 transmits the Y-SEL signal (step 212 in FIG. 8A) thereby to couple the Vy signal through the analog gate circuit 57 to the comparator circuit 61. The analog-to-digital conversion subroutine (step 213) then provides a Y position control byte that represents the Vyref signal. When this is completed, the pad flag in location 2A of the memory 152 is set (step 214). Then the control 60 calls the latch subroutine (step 192) to transfer the X and Y position control bytes to the output latches 71 and 72 to update those latches and presets the word burst counter (step 197) and transfers control to step 200. Whenever the pad 32 or any of the buttons 33, 34, or 35 is activated, the control 60 uses the foregoing steps to form a position control word that includes a command header, control byte, and X and Y position control bytes.

Step 200 is a first step in a sequence for converting the position control word in digital form into a form that is adapted for recording on magnetic tape. In step 200 the control 60 clears the low flag (location 2B in FIG. 7) and the transition flag (location 2C). Then the control 60 initiates a blank time interval by starting the timer 168 in FIG. 7 (step 214) during which it calls a TAPE SIG subroutine (step 215) to determine whether a signal transition occurs. The blank time interval corresponds to the space between successively recorded position control words; and during this time the TAPE SIG subroutine detects any positive transition of the SIG IN signal. During this particular portion of the operation, a SIG IN signal transition would be detected only if the operator were using the actuator 25 to override recorded control information that was being received from the tape during actual tape playback.

Referring to FIG. 8C, the tape sig subroutine first tests the low flag (step 216), which the control 60 cleared in step 200. This corresponds to a high level of the SIG IN signal. So long as the SIG IN signal remains at a high level, step 216 branches to step 217 to complete the subroutine. When the SIG IN signal shifts to a low value, control passes from step 216 through step 217 to step 220 whereupon the low flag is set and to step 221 to complete the subroutine. So long as the SIG IN signal remains at a low level, control passes from step 216 to step 221. When the SIG IN signal again shifts to a high level, step 221 branches to step 222 to set the transition flag. Thus, the transition flag sets only in response to a positive going transition of the SIG IN signal.

When the blank time interval has been completed (step 223 in FIG. 8A) the control 60 turns off the timer 168 in step 224. In step 225, the control 60 turns on the FSK oscillator 64 in FIG. 3 if it is not already on, to a frequency corresponding to a logical "1" that is the value of a first, synchronizing bit in the pointer control word. The time interval for each bit is established by a phase subroutine called by the control 60 (step 226). Referring again to FIG. 8C, the phase subroutine utilizes a phase time number to preset a timer (step 227). The timer starts in step 230. When the phase time interval is completed (step 231) the timer stops (step 232).

When this initial "1" has been transmitted, the control 60 retrieves the header command byte from the R2 register and sets another register to the number of bits in the header command byte. This occurs in step 233 (FIG. 8A) and then, in step 234, the control calls a transmit subroutine to control the FSK oscillator 64.

Referring to FIG. 8C, if the first bit in the header command byte is a "1", step 235 branches to step 236. The control 60 conditions the SIG OUT signal to a "0" level for an interval determined by the phase subroutine (step 237). Then the SIG OUT signal is shifted to a "1" level (step 240) for another interval (step 241). If the bit is a "0", step 235 branches to step 242 to set the SIG OUT signal for a "1" for a time determined by the phase subroutine (step 243). Then the control 60 shifts the SIG OUT signal to a "0" level (step 244) for the phase interval established in step 241. It will be apparent that the phase time interval is approximately one-half the bit time and that this transmit subroutine provides digital encoding that facilitates the conversion of the digital signals into frequency-shift-keyed modulation for recording.

After the bit is transmitted, the control 60 aligns a next bit position for transmission in step 245 and in step 246 (FIG. 8A) it tests to determine if all the bits in the header command byte have been transmitted. If they have not, step 246 branches back to step 234.

Once all the bits in the header command byte have been transmitted, the control 60 uses analogous operations to transmit the X position control byte in the X REG register (steps 247, 250, and 251) and the Y position control byte in the Y REG register (steps 252, 253, and 254). If the recorder 57 is recording, the header, X-position, and Y-position control bytes are thereby recorded on the control track in frequency-shift-keyed form. The FSK oscillator 64 shifts to a "0" value in step 255 to record the corresponding frequency between adjacent position control words. If the header command byte corresponds to a forward or reverse command, steps 256 and 257 return control to step 200 to record the control words multiple times. When all the forward or reverse control words are thus recorded, the control turns off the FSK oscillator 64 in step 258 and calls a relay subroutine in step 259.

The relay subroutine is shown in FIG. 8C and it controls the total relay energization time. As will be recalled, steps 184 and 186 energize the relays. The control 60 starts a timer in step 260, awaits the indication that the interval has been completed (step 261), and turns off the timer (step 262). Then a word is transferred (step 263) to the port 2 bus buffer 177 (FIG. 7) that disables both relays, thereby turning off the one relay that has been energized. After a further time delay (step 264), the relay subroutine terminates and control returns to step 182 in FIG. 8A.

If the control word is a home command, step 256 (FIG. 8A) branches to step 265 that, in turn, branches to step 266. Step 266, in turn, branches back to step 200 if the required number of word bursts have not been transmitted. Thus, a home command is also recorded with multiple control words before the FSK oscillator is turned off (step 267) and control returns to step 182. If a PAD command is being recorded, only one word is recorded, so step 265 returns control to step 182 while leaving the FSK oscillator on to continue recording the "0" frequency between successive pointer control words.

Thus, whenever an operator actuates any control member on the actuator 25 (FIG. 3), the previous steps convert the signals into a succession of control words that each comprise a synchronizing bit, a header command byte, an X position control byte, and a Y position control byte in sequence. Moreover, the control 60 uses these signals to control the FSK oscillator 64 and the analog gate 65 so that frequency shift keyed signals are available. If, while an operator is recording, he removes pressure from the pad 32, the control 60 will pass through steps 183, 185, 187, and 201 to step 268 in FIG. 8B. In the recording mode, the SIG IN signal cannot undergo a transition, so step 268 branches to step 269. As the pad flag is set (step 213), step 269 branches to step 200 in FIG. 8A. As the numbers in the X and Y registers correspond to the last position of the highlighting spot, these positions will continue to be converted for recording along with the pad header command byte. Moreover, with the PAD signal at a nonasserted level, they control the position of the spot on the image. These steps therefore implement the park mode.

During playback the transition flag is set when a first positive transition of the SIG IN signal occurs, and it remains set unless the operator uses the control device 25. In step 268 in FIG. 8B, control normally branches to step 270 that starts a watch timer (i.e., the timer 168) that defines an interval that is longer than the blank time interval and during which another positive transition should occur. This transition should be the leading edge of the obligatory "1" of the next control word. Steps 271 through 274 detect the positive-going transition of the SIG IN signal. If no such transition occurs, no control word is detected and control transfers to step 269. If the pad flag is not set, as it normally will not be during playback, step 275 calls the tape sign subroutine to detect a transition, and then control returns to step 183 in FIG. 8A. Otherwise control passes from step 274 to step 276.

If the operator were to use the pad 32 during playback, then step 268 would override the playback signals because the pad flag would have been set (step 213 in FIG. 8A). Thus, control would pass to step 200 in FIG. 8A.

When a positive transition is detected during the watch time interval, control passes to step 276 whereupon the control 60 turns off the watch timer 168. The control clears the pad and error flags in step 277, and then sets a bit counter for the number of expected bits in the header command byte in step 278. In step 281, the control 60 calls a bit subroutine in FIG. 8D that converts the signals from the phase lock loop 70 into a sequence of header and position control bytes.

Figure 8D:
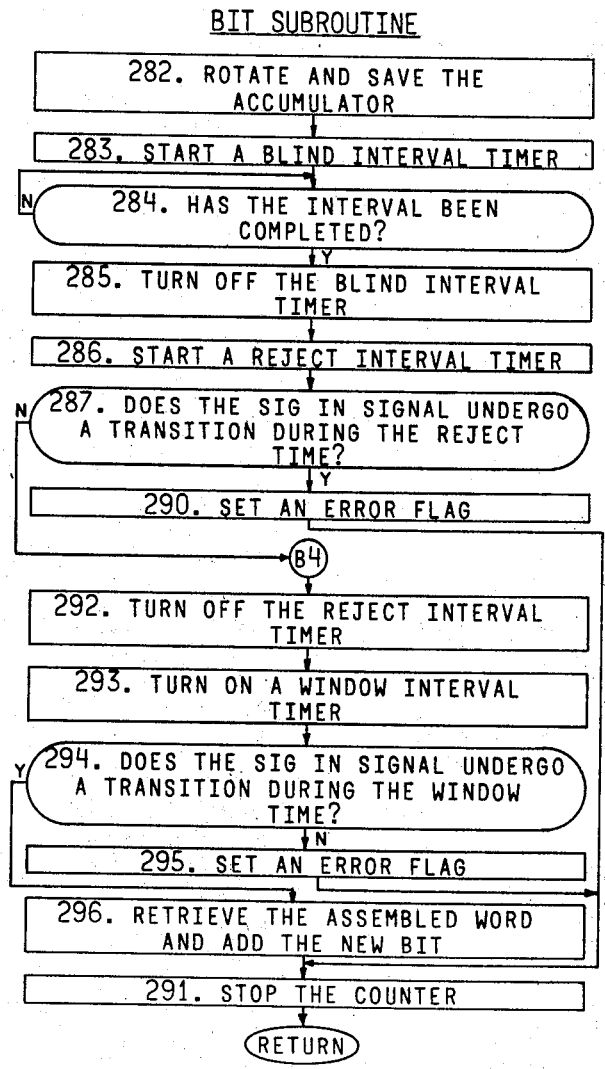

Referring to FIG. 8D, after aligning an accumulator (step 282) in the arithmetic logic unit 172 and after the passage of a blind interval time (steps 283 through 285) during which there is no response to any signal transitions, the control 60 defines a reject interval during which no transitions of the SIG IN signal should occur (step 286). If the SIG IN signal undergoes a transition during this reject interval (step 287), the error flag 173 sets (step 290). Then the timer 168 is turned off (step 291) and control returns to the calling routine.

If no reject error occurs, the timer 168 turns off (step 292) and a window interval is established by the timer 168 (beginning with step 293). A transition of the SIG IN signal should occur during this interval. If no such transition occurs (step 294), the F1 error flag 173 sets (step 295) and the timer turns off (step 291). Then the control 60 returns to the calling routine. If the SIG IN signal does undergo a transition, as it should, a digital value associated with the transition is loaded into the accumulator in the new position (step 296) and control returns to the calling routine.

Referring again to FIG. 8B, each time the bit subroutine is completed, the F1 error flag 173 is tested (step 297). If an error occurs because a transition occurs during the reject interval or does not occur during the window interval, any previously assembled bits in the header byte are disregarded. Moreover, the control returns to step 182 in FIG. 8A, so the SIG IN signal is not monitored. As a result, the control inhibits any further response to that sequence of control words, and the highlighting spot does not move. Also, no slide changes occur in response to a header and positioning control bytes in the improperly received sequence. This renders the system relatively immune to various conditions such as random restarts, noise, dropout, power loss, or tape speed. All of these conditions generally manifest themselves at least by varying the timing of the transitions of the received SIG IN signals. Thus, the use of the blind, reject, and window intervals and the tests during the reject and window intervals minimize improper responses under any or all of these conditions. Moreover, the multiple recording of any sequence involving a slide change command in a header control byte provides further reliability. As is apparent, three sequences in a row would have to be decoded with errors before an actual error would occur. This is highly unlikely. Moreover, the lag time delays provided by the relay subroutine inherently prevent multiple relay responses to validly decoded sequences, as the total interval for decoding and playing back the three sequences is short in comparison to the relay subroutine intervals.

If no error is detected, a next bit in the header is assembled (step 298) and control is transferred back to step 281. When all the header bits are received the header command byte is stored in the register R2 shown in FIG. 7 (step 300); and then the control uses an analogous set of steps, generally designated by reference numeral 301, to assemble the X bits and store them in the X REG register and another analogous set of steps 302 to assemble the Y bits and store them in the Y REG register.

After the header, X REG, and Y REG registers are assembled, the header command byte is tested in steps 303 through 305 to determine if it contains a valid command. If it does not, the control passes to step 182 in FIG. 8A. If any of the valid command codes are tested, the corresponding X and Y position bytes are transferred to the latches 71 and 72 (steps 306 and 307) to move the spot. If a homing or positon command is decoded, control passes back to step 182 in FIG. 8A. However, if a forward or reverse command is decoded (step 310) the control 60 energizes the corresponding relay (step 311) and then calls the relay routine (step 312). After the relay interval, control passes back to step 182 in FIG. 8A.

While the foregoing description relates to very specific transfers of information within the control 60 and the other circuitry shown in FIGS. 3 and 7, it will now be helpful to summarize the overall response to different operating conditions. While an operator is recording a program, the operator normally will initiate a slide operation by depressing a forward slide change button 33. The control 60 utilizes the steps at the upper left of FIG. 8A as a device monitoring process that monitors the status of the control device 25. In this example, the control 60 uses step 183 to energize the forward relay in step 184 and clear the X REG register, the Y REG register and the pad flag in step 191. Then in step 192, which is the first step in a process for converting the analog signal into the frequency shift keyed signal to be recorded, the positioning information is moved to the bus buffer 174. After a blank time delay that determines the separation between successive control words, the control 60 energizes the forward relay 77 and then converts the forward command into a serial binary bit stream that controls the FSK oscillator 64. As indicated, this defines a header command byte that then is followed by positioning control bytes from the X REG and Y REG registers, each having values of "00".

As the operator uses the pad 32, the mode circuit 41 generates the PAD signal. The control 60 uses the remaining steps in FIG. 8A as a first conversion process that converts the PAD, Vxref and Vyref signals into control bytes that control the FSK oscillator 120 and the signals it provides to the recorder 57. A control word is thus recorded for each sample of the Vxref and Vyref signals.

If the operator stops using the pad 32, the PAD signal from the mode circuit 41 shifts to a non-asserted level. The control 60 then uses portions of the second conversion process to generate the second position control signals that actually control the position of the highlighting spot. As the position signals do not change while the PAD signal is not asserted, the highlighting spot remains stationary at its last position. Moreover, no new sequences are recorded. This is the "park" condition.

During playback, the control device 25 normally will not be actuated. In this case, the control 60 monitors the incoming signal from the phase lock loop 70 and utilizes the second conversion process in FIG. 8B to decode the signals, test them against predetermined time intervals, and assemble the header and position control bytes. If all the control bytes are received in proper form, the control 112 transfers control words to the latches 71 and 72 respectively and energizes the forward and reverse relays as appropriate. As the PAD signal from the mode circuit 104 is not asserted, the resulting $V_x'$ and $V_y'$ signals from the digital-to-analog converters 73 and 75 are coupled through analog gates 52 and 53 and control the highlighting spot.

If, during the playback mode, the operator were to actuate the pad 32, the mode circuit 41 would produce the PAD signal. The signals from the pad read circuit 40 then would be coupled through the analog gates 42 and 43 to the pointer control circuit 46 and would override the recorded control signals contained in the latches 71 and 72. As soon as the pad 32 were deenergized, the control 60 would again respond to the recorded information to control the pointer control circuit 46 and the relays 77 and 81.

3. Pointer Control Circuit 46

The pointer control circuit 46 of FIG. 3 includes two separate servo control circuits. One controls the servomotor 50; the other, the servomotor 51. Both servo control circuits are identical, so the following discussion is limited to the servo control circuit that controls the Y servomotor 51 in response to the Vy ref signal.

Figure 10:
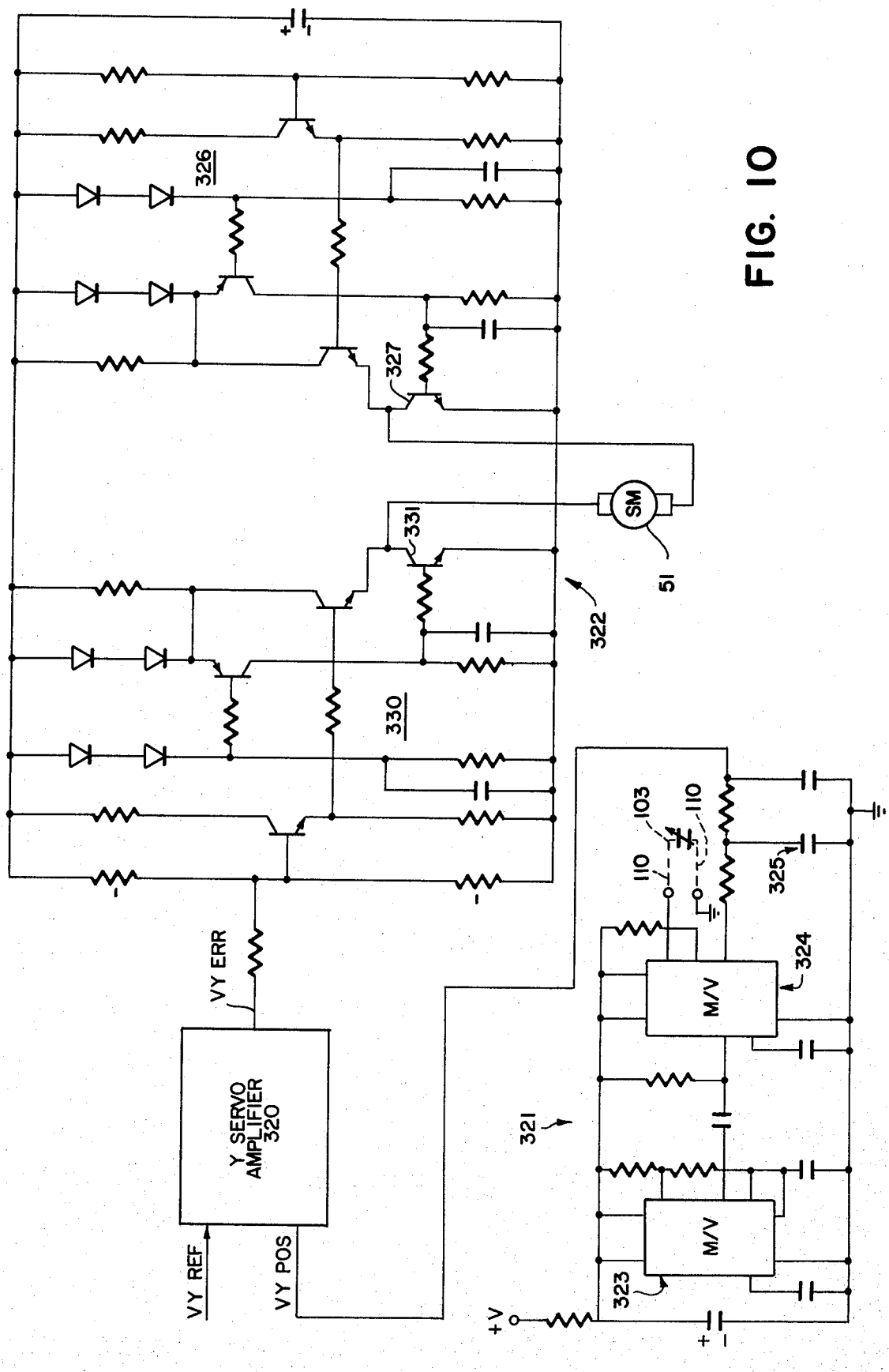
FIG. 10 is a detailed block diagram of a pointer control circuit that is shown in FIG. 3.

Referring to FIG. 10, the Vy ref signal is applied to one input of a conventional servo amplifier 320 which compares it with a positioning signal Vy pos from a position sensing circuit 321. A resulting error signal, Vy err, controls a motor drive circuit 322 that energizes the servo motor 51 (also shown in FIGS. 3 through 5).

The position sensing circuit 321 utilizes the capacitive transducer 103 shown in FIG. 4 and 5 to produce the Vy pos signal. Specifically, a first timer, in the form of a multivibrator 323, operates as a fixed frequency oscillator. Each time its output undergoes a positive going transition it triggers a second timer, in the form of a monostable multivibrator 324. However, the "on-time" for this timer is controlled by the sensor 103. Thus the multivibrator 324 produces a train of pulses that have a fixed frequency determined by the fixed oscillator and a duty cycle proportional to the capacitance of the sensor 103. A low pass filter 325 converts the pulse train into an analog Vypos signal linearly related to the "y" position of the highlighting spot.

The motor drive circuit 322 comprises a differential amplifier. A right portion 326 establishes a reference voltage at an output transistor 327. A left portion 330 establishes a signal at its output transistor 331 that reflects the Vyerr signal. The error signal can cause the voltage from the transistor 331 to be greater or less than that from the transistor 327. Thus, the motor 51 is energized by a bipolar, variable amplitude voltage to position the highlighting spot in the vertical direction in accordance with the Vref signal and in a direction to minimize the Vyerr signal.

F. Other Apparatus and Embodiments

Figure 11:
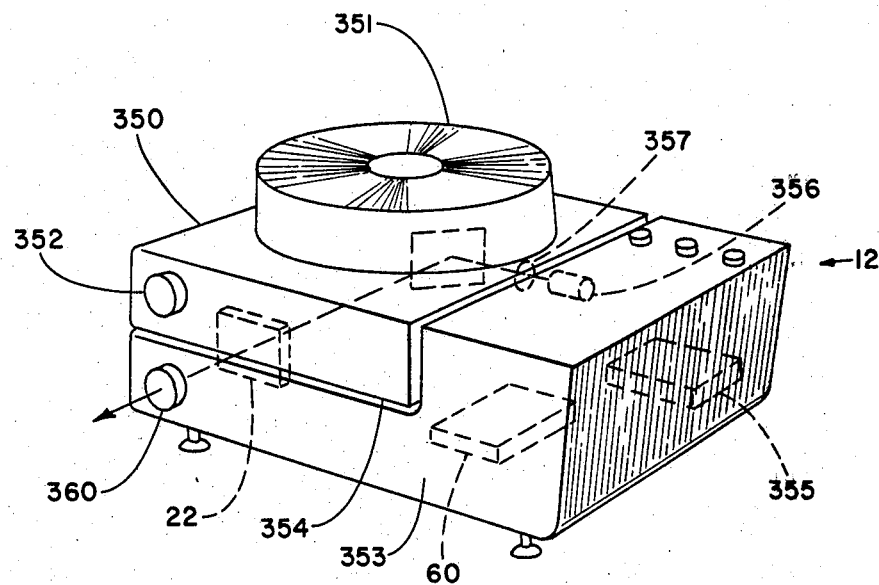
FIG. 11 is a simplified perspective view of an automatic pointer apparatus according to the invention and mounting in a standard, front screen slide projector.

FIG. 11 depicts the application of the invention to a conventional, front-screen slide projector 350 that has a rotating slide tray 351 mounted over the projector 350. The projector 350 directs the image of a slide through a projection lens 352 to a conventional screen (not shown). The pointer apparatus has a housing 353 with a step-like recess 354 that is adapted to receive and locate the slide projector 350.

A conventional, two-track audio cassette tape recorder 355 mounts within the housing 353. A light source 356, an associated condensing lens 357, the pointer mechanism 22, and a pointer image projection lens 360 are in the housing 353 and together produce the highlighting spot. The control 60 is also mounted in the housing 353 and interconnects the recorder 355, the pointer mechanism 22, and an external manual pointer control device, such as the device 25 in FIG. 2.

Figure 12:
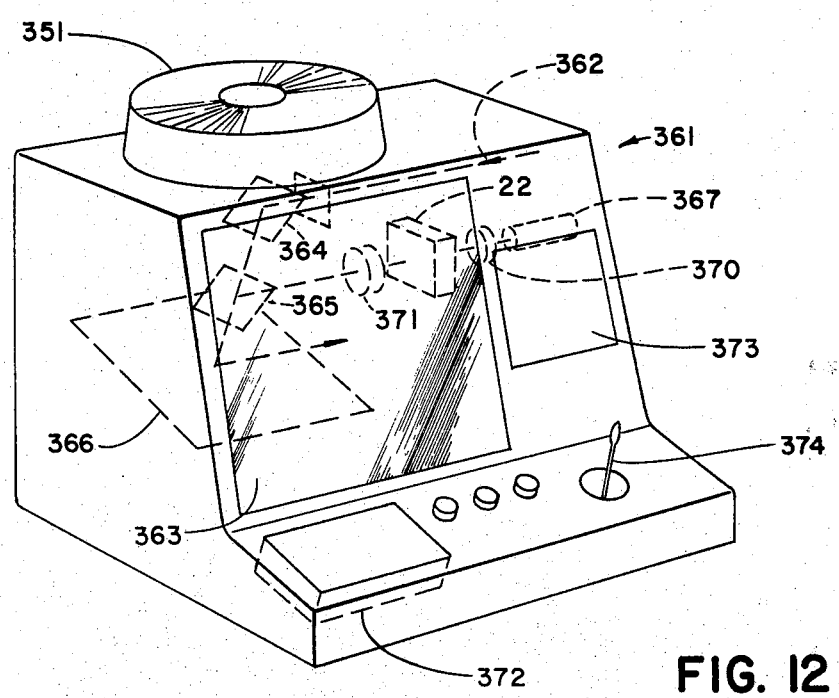
FIG. 12 is a simplified perspective view of a rear projection viewer that incorporates an automatic pointer apparatus according to this invention.

FIG. 12 shows a conventional rear projection slide viewer 361 modified to include an automatic pointer apparatus according to this invention. The illustrated viewer uses the same rotating slide tray 351 as the front screen projector of FIG. 11. As the tray indexes, a slide drops through a slot in the viewer where it is illuminated by a beam of light 362. The image thus formed is directed onto a viewing screen 363 by a set of mirrors mounted within the viewer including mirrors 364, 365 and 366. In addition, a light source 367, a lens 370, a pointer mechanism 22, and a pointer projection lens 371 are disposed within the viewer. These elements are aligned to direct the image of the highlighting spot to the mirror 365 that "feeds" the mirror 366 and the viewing screen 363 with both images. The viewer 361 also includes an audio recorder 372, which reproduces the recorded audio program with a speaker 373. A manual control device 374, in the form of a joy stick mechanism, controls the position of the highlighting spot.

G. SUMMARY OF THE DESCRIPTION

There has been disclosed a circuit and mechanism for providing an automatic pointer apparatus for a sequence of projected visual images that is movable continuously in close coordination with an accompanying recorded audio program. The specific embodiments shown in FIGS. 1 through 10 provide an automatic pointer apparatus that has a relatively low cost. The mechanism shown in FIGS. 4 and 5 is rugged and, in conjunction with the control 60, provides a highly reliable device that is not susceptible to malfunction due to random restart, noise, dropout, power loss, or tape speed variations. As will be apparent from the foregoing discussion, this invention also is adaptable for a variety of audiovisual media as shown in FIGS. 11 and 12.

The coupling of the PAD signals directly from the pad read circuit 40 to the pointer control circuit 46 provides an apparatus that has a smooth and natural response to actuation of a manually controlled actuator such as the control device 25. This natural response allows an operator to concentrate fully on the audio portion of the program and tends not to divert his concentration from that primary function. As a result, audio programs should be recorded in a more natural and flowing manner.

The apparatus that achieves these objects and that is disclosed in but one embodiment of this invention. It will be apparent to those of ordinary skill in the art that many different embodiments of the circuitry shown in FIGS. 3 and 7 can be utilized to implement this invention. For example, the control 60 is shown as being implemented with a programmed microprocessor. Combinatorial logical elements can also be used to provide the control. Different operating sequences can also be provided to monitor the operation of the general circuitry and other apparatus constructed in accordance with this invention.

The pointer image can have a variety of shapes, such as an arrow or a square, but is preferably a small disk of white light. The pointer disk need not be brighter than the brightest area of the slide image in order to highlight the pointed area effectively. It has been found that a combined pointer spot and image brightness that is one and one-fourth that of the brightest image area is adequate.

The construction of the control device 25 and the mechanism in FIGS. 4 and 5 also can be altered.

In fact, a wide range of variations and modifications can be made to the specifically disclosed embodiments while still achieving some or all of the advantages of this invention. Therefore, it is the object of the appended claims to cover all such variations and modifications as come within the true spirit and scope of this invention.

What is claimed is:

1. Apparatus for use with a photographic image projector of the type that can be automatically controlled to project images recorded on photographic media, said apparatus controlling the position of a pointer image that is suspended with respect to the projected image and said apparatus comprising:
   A. positioning control means for generating first positioning control signals in a first form,
   B. positioning means for positioning the pointer image with respect to the projected image in response to positioning control signals in the first form,
   C. first signal conversion means for converting the positioning signals from said positioning control means to signals in a second form adapted for being recorded,
   D. mode selection means connected to said positioning control means and said positioning means for coupling the first positioning control signals to said positioning means during first mode of operation,
   E. second signal conversion means connected to said mode selection means for generating second positioning control signals in the first form in response to signals in the second form, said mode selection means alternatively coupling the second positioning control signals to said positioning means during a second mode of operation, and
   F. latch means connected to said first and second signal conversion means for storing successive first position control signals in said second form during said first mode and for providing the last stored of said first position control signals to said second conversion means after said first mode of operation in order to maintain the last pointer range position from said first mode, said latch means otherwise operating during said second mode to store and input said second signal conversion means with previously recorded signals of the second form.

2. The apparatus defined in claim 1 in which said second form of said signals is a digital representation of the signals in said first form.

3. Apparatus as defined in claim 2 in which
   A. said positioning control means is actuated by an operator of said apparatus, and
   B. said mode selection means responds to said positioning control means by providing said first mode of operation when said positioning control means is actuated and providing said second mode of operation when said positioning control means is not actuated.

4. Apparatus as defined in claim 1 in which
A. said positioning control means is actuated by an operator of said apparatus, and
B. said mode selection means responds to said positioning control means by providing said first mode of operation when said positioning control means is actuated and providing said second mode of operation when said positioning control means is not actuated.

5. The apparatus defined in claim 1 including:
A. recording means having
   i. a recording mode in which it records input signals, and
   ii. a playback mode in which it provides output signals corresponding to signals that it has previously recorded, and
B. means for providing said second form of positioning control signals as position input signals for said recording means.

6. The apparatus defined in claim 5 including means responsive to the occurrence of position output signals of said recording means by providing said position output signals as input to said latch means, whereby said positioning means is controlled in response to recorded signals when said recording means output signals are present during non-actuation of said positioning control means.

7. The apparatus defined in claim 6 including means for loading said latch means
A. during said first mode of operation, with successive signals from said first conversion means, and
B. during said second mode of operation, with position output signals from said recording means, whereby during said second mode of operation said positioning means positions the pointer image in response to position control signals from said recording means when said signals are received from said recording means and maintains the image position corresponding to the last signals loaded into said latch means in the absence of position control signals from said positioning control means and said recording means.

8. The apparatus defined in claim 5 in which said recording means includes
A. means for converting said input signals into frequency modulated signals during said recording mode and recording said frequency modulated signals on a magnetic recording medium, and
B. means for retrieving said frequency modulated signals from said recording medium during said playback mode and converting said retrieved signals into said second form.

9. The apparatus defined in claim 5 including
A. function actuation means for initiating the performance of projector functions by the projector, and
B. function control means responsive to the function actuation means to cause the projector to perform said projector functions, said function control means including:
i. means for encoding the individual ones of said projector functions as function signals in said second form and providing said function signals as function input signals for said recording means, whereby said recording means provides function output signals corresponding to said function input signals when said recording means is in said playback mode, and
ii. means for responding to said function output signals by causing said projector to perform the projector functions encoded in said signals.

10. The apparatus defined in claim 9 in which said function control means further responds to said function actuation means by generating position signals in said second form corresponding to a predetermined position of said pointer image.

11. Apparatus as defined in claim 10 in which
A. said function control means responds to actuation of said position control means by generating a function signal in said second form corresponding to the function of positioning the pointer image, and
B. said function control means provides input signals to said recording means in sets each of which includes function signals designating a function and position signals designating a position of the pointer image.

12. Apparatus as defined in claim 9 which said projector functions include
A. a forward function in which said projector is caused to project the next image in a series of images and
B. a reverse function in which said projector is caused to project the previous image in said series of images.

13. Apparatus as defined in claim 9 in which
A. said function actuation means includes means for initiating the performance of a position function by said positioning means whereby said positioning means positions said pointer image at a predetermined location, and
B. said function control means responds to the initiation of said position function by encoding said position function as a further function signal in said second form and generating a corresponding position signal in said second form designating said predetermined location whereby said recording means provides position output signals corresponding to said position function input signals when said recording means is in said playback mode, and said function control means responds to said position function output signals by causing said positioning means to position said pointer image at said predetermined location.

14. The apparatus defined in claim 1 including
A. function actuation means for initiating the performance of projector functions by the projector, and
B. function control means responsive to the function actuation means to cause the projector to perform said projector functions, said function control means including:
   i. means for encoding the invididual ones of said projector functions as function signals in said second form and providing said function signals as function input signals for said recording means, whereby said recording means provides function output signals corresponding to said function input signals when said recording means is in said playback mode, and
   ii. means for responding to said function output signals by causing said projector to perform the projector functions encoded in said signals.

15. The apparatus defined in claim 14 in which said function control means further responds to said function actuation means by generating position signals in said second form corresponding to a predetermined position of said pointer image and loading such position signals into said latch means.

16. The apparatus defined in claim 15 in which
   A. said function control means responds to actuation of said position control means by generating a position function signal in said second form corresponding to the function of positioning the pointer image,
   B. said function control means provides the input signals to said recording means in input sets each of which includes input position signals and function signals designating a function, whereby when said recording means is in said playback mode it provides its output signals in sets each of which includes function output signals and position output signals, and
   C. said function control means loads said position output signals into said latch means, whereby when said mode selection means is in said second mode, said pointer image is positioned in accordance with said position output signals.

17. Apparatus as defined in claim 14 in which said projector functions include
   A. a forward function in which said projector is caused to project the next image in a series of images and
   B. a reverse function in which said projector is caused to project the previous image in said series of images.

18. Apparatus as defined in claim 14 in which
   A. said function actuation means includes means for initiating the performance of a position function by said positioning means whereby said positioning means positions said pointer image at a predetermined location, and
   B. said function control means responds to the initiation of said position function by encoding said position function as a further function signal in said second form and generating a corresponding position signal in said second form designating said predetermined location whereby said recording means provides position output signals corresponding to said position function input signals when said recording means is in said playback mode, and said function control means responds to said position function output signals by causing said positioning means to position said pointer image at said predetermined location.

19. The apparatus defined in claim 1 in which
   A. said positioning means generates said positioning control signals in sets, each set corresponding to a first position of the pointer image along a first axis and a second position of said image along a second axis intersecting said first axis, and
   B. said positioning means includes separate means for positioning said pointer image along said first and second axes.

* * * * *